US006993606B1

(12) United States Patent
Takaku et al.

(10) Patent No.: US 6,993,606 B1
(45) Date of Patent: Jan. 31, 2006

(54) COMMUNICATION METHOD AND COMMUNICATION APPARATUS FOR DATA COMMUNICATION BETWEEN DEVICES CONNECTED BY A NETWORK

(75) Inventors: Yoshiyuki Takaku, Tokyo (JP); Mari Horiguchi, Kanagawa (JP); Makoto Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 631 days.

(21) Appl. No.: 09/714,317

(22) Filed: Nov. 16, 2000

(30) Foreign Application Priority Data

Nov. 18, 1999 (JP) ................................ P11-328764
Mar. 10, 2000 (JP) ............................ P2000-066966

(51) Int. Cl.
*G06F 13/00* (2006.01)

(52) U.S. Cl. ............................ 710/61; 710/46; 710/17; 709/230

(58) Field of Classification Search ............ 710/58–61, 710/5–7, 15–18, 29, 31–33, 46–50; 709/220–223, 709/230–237; 713/201; 340/825.24; 711/163
See application file for complete search history.

(56) References Cited

U.S. PATENT DOCUMENTS

| | | | | |
|---|---|---|---|---|
| 4,855,730 | A * | 8/1989 | Venners et al. | 340/825.24 |
| 6,360,287 | B1 * | 3/2002 | Kawamura | 710/61 |
| 6,466,971 | B1 * | 10/2002 | Humpleman et al. | 709/220 |
| 6,519,701 | B1 * | 2/2003 | Kawamura et al. | 713/201 |
| 6,546,419 | B1 * | 4/2003 | Humpleman et al. | 709/223 |

* cited by examiner

*Primary Examiner*—Christohper Shin
(74) *Attorney, Agent, or Firm*—Jay H. Maioli

(57) ABSTRACT

A sink apparatus receives stream data outputted from a source apparatus connected to a predetermined network. When the source apparatus or an other apparatus connected to the network transmits a command to configure a data input section of the sink apparatus to input data outputted from the source apparatus, data are prepared to indicate that a configuration of the data input section is at least temporarily disabled as a response from the sink apparatus. When the apparatus that transmitted the command receives the data indicating that the configuration is at least temporarily disabled corresponding processing may be executed. When stream data are transmitted through a network it can be easily determined by an other apparatus on the network whether the sink apparatus is ready to input data.

23 Claims, 29 Drawing Sheets

FIG. 9A ctype/response

| | | |
|---|---|---|
| Command | 0000 | CONTROL |
| | 0001 | STATUS |
| | 0010 | SPECIFIC INQUIRY |
| | 0011 | NOTIFY |
| | 0100 | GENERAL INQUIRY |
| | 0101 ~ 0111 | (reserved for future specification) |
| Response | 1000 | NOT IMPLEMENTED |
| | 1001 | ACCEPTED |
| | 1010 | REJECTED |
| | 1011 | IN TRANSITION |
| | 1100 | IMPLEMENTED/STABLE |
| | 1101 | CHANGED |
| | 1110 | (reserved for future specification) |
| | 1111 | INTERIM |

FIG. 9B subunit_type

| | |
|---|---|
| 00000 | Video monitor |
| ~ | (reserved ) |
| 00011 | Disc recorder/ Player |
| 00100 | Tape recorder/ Player |
| 00101 | Tuner |
| 00111 | Video Camera |
| ~ | (reserved ) |
| 11100 | Vendor unique |
| 11101 | reserved |
| 11110 | Subunit type extended to next byte |
| 11111 | Unit* |

FIG. 9C opecode:Operation Code

| | |
|---|---|
| 00h | VENDOR-DEPENDENT |
| 50h | SEARCH MODE |
| 51h | TIMECODE |
| 52h | ATN |
| 60h | OPEN MIC |
| 61h | READ MIC |
| 62h | WRITE MIC |
| C1h | LOAD MEDIUM |
| C2h | RECORD |
| C3h | PLAY |
| C4h | WIND |
| ~ | ~ |

FIG. 10

| | msb | | | | | | lsb |
|---|---|---|---|---|---|---|---|
| opcode | INPUT SELECT | | | | | | |
| operand[0] | input_plug | | | | | | |
| operand[1] | node_ID | | | | | | |
| operand[2] | | | | | | | |
| operand[3] | output_plug | | | | | | |
| operand[4] | path_chg | reserved | | 1 | 1 | 1 | 1 |

FIG. 11

| operand[2] | connected_plug_ID |
|---|---|
| 0-1E$_{16}$ | Serial Bus oPCR[0]-oPCR[30] |
| 1F$_{16}$-7F$_{16}$ | Reserved |
| 80$_{16}$-9E$_{16}$ | External output plug 0-30 |
| 9F$_{16}$-FF$_{16}$ | Reserved |

FIG. 12

| value | |
|---|---|
| 0 | No Path Change Data |
| 1 | Path Change Data |

FIG. 13

| | msb | | | | | | | lsb |
|---|---|---|---|---|---|---|---|---|
| opcode | INPUT SELECT | | | | | | | |
| operand[0] | input_plug | | | | | | | |
| operand[1] | connected_node_ID | | | | | | | |
| operand[2] | | | | | | | | |
| operand[3] | connected_plug | | | | | | | |
| operand[4] | path_chg | reserved | | | result_status | | | |

FIG. 14

| value | input_plug |
|---|---|
| 0-$1E_{16}$ | Serial Bus plug zero—30 |
| $1F_{16}$-$7F_{16}$ | Reserved for future specification |
| $80_{16}$-$9E_{16}$ | External plug zero—30 |
| $9F_{16}$-$FF_{16}$ | Reserved for future specification |
| $FF_{16}$ | (not applicable for ACCEPTED response) |

*FIG. 15*

| value | meaning | return |
|---|---|---|
| 0000 | succeeded | ACCEPTED |
| 0001 | ready | ACCEPTED |
| 0010 | busy | ACCEPTED |
| 0011 | failed | ACCEPTED |
| 0100 | disabled | REJECTED |
| 0101 | locked | REJECTED |
| 0110 | p-to-p(not owner) | REJECTED |
| 0111 | insufficient resource | REJECTED |
| 1000 | source not found | REJECTED |
| 1001 | not selected | REJECTED |
| 1010 | not registered | REJECTED |
| 1011-1100 | reserved | |
| 1101 | any other reason | REJECTED |
| 1110 | no information | INTERIM |
| 1111 | busy | INTERIM |

FIG. 16

| | msb | | | | | | | lsb |
|---|---|---|---|---|---|---|---|---|
| opcode | INPUT SELECT | | | | | | | |
| operand[0] | input_plug | | | | | | | |
| operand[1] | $FF_{16}$ | | | | | | | |
| operand[2] | | | | | | | | |
| operand[3] | | | | | | | | |
| operand[4] | | | | | | | | |

FIG. 17

| | msb | | | | | | | lsb |
|---|---|---|---|---|---|---|---|---|
| opcode | INPUT SELECT(2916) | | | | | | | |
| operand[0] | input_plug | | | | | | | |
| operand[1] | connected_node_ID | | | | | | | |
| operand[2] | | | | | | | | |
| operand[3] | connected_plug | | | | | | | |
| operand[4] | reserved | | | | status | | | |

FIG. 18

| value | meaning |
|---|---|
| 0000 | reserved |
| 0001 | Connection is Active(without specific node ID) |
| 0010 | Connection is Busy(with specific node ID) |
| 0011 | Connection is ready(with specific node ID) |
| 0100 | transfer format incompatible |
| 0101 | source device is not selected |
| 0110-1111 | reserved |

FIG. 28

| | msb | | | | | | | |
|---|---|---|---|---|---|---|---|---|
| opcode | INPUTSELECT(1B6) | | | | | | | |
| operand [0] | subfunction | | | | | | | |
| operand [1] | reserved | | | | $F_{16}$ | | | |
| operand [2] | node_ID | | | | | | | |
| operand [3] | | | | | | | | |
| operand [4] | Output_plug | | | | | | | |
| operand [5] | input_plug | | | | | | | |
| operand [6] | | | | | | | | |
| operand [7] | signal_destination_plug | | | | | | | |
| operand [8] | reserved | | | | | | | |

FIG. 29

| Value | subfunction | Meaning |
|---|---|---|
| $0_{16}$ | Connect | Establish Connetion With Output Device |
| $1_{16}$ | Path change | Chage Path in the State in Which Device is Selected |
| $2_{16}$ | Select | Select Device But do Not Establish Connection |
| $3_{16}$ | disconnect | Disconnect Connection With Output Device |

FIG. 30

| Value | output_plug |
|---|---|
| $00_{16}$-$1E_{16}$ | Serial Bus oPCR [0] _oPCR [30] |
| $1F_{16}$-$7E_{16}$ | Reserved |
| $7F_{16}$ | Not applicable |
| $80_{16}$-$9E_{16}$ | External output plug0-30 |
| $9F_{16}$-$FD_{16}$ | Reserved |
| $FE_{16}$ | Invalid |
| $FF_{16}$ | Any available external output plug |

FIG. 31

| Value | output_plug |
| --- | --- |
| $00_{16}$-$1E_{16}$ | Serial Bus oPCR [0] _oPCR [30] |
| $1F_{16}$-$7F_{16}$ | Reserved |
| $7F_{16}$ | Any available Serial Bus oPCR [x] |
| $80_{16}$-$9E_{16}$ | External output plug0-30 |
| $9F_{16}$-$FD_{16}$ | Reserved |
| $FE_{16}$ | Invalid |
| $FF_{16}$ | Any available External output plug |

FIG. 32

| Value | signal destination_plug |
| --- | --- |
| $00_{16}$-$1E_{16}$ | Destination plug0-30 |
| $1F_{16}$-$FD_{16}$ | Reserved |
| $FE_{16}$ | Invalid |
| $FF_{16}$ | Any available Destination plug |

FIG. 33

| | msb | |
| --- | --- | --- |
| opcode | INPUTSELECT(1B6) | |
| operand [0] | subfunction | |
| operand [1] | reserved | result_status |
| operand [2] | node_ID | |
| operand [3] | | |
| operand [4] | Output_plug | |
| operand [5] | input_plug | |
| operand [6] | signal_destination | |
| operand [7] | | |
| operand [8] | reserved | |

FIG. 34

| Value | result_status | Return Command Type |
|---|---|---|
| $0_{16}$ | no error | ACCEPTED |
| $1_{16}$ | disabled | REJECTED |
| $2_{16}$ | locked | REJECTED |
| $3_{16}$ | p-to-p(not owner) | REJECTED |
| $4_{16}$ | insufficient resource | REJECTED |
| $5_{16}$ | source not found | REJECTED |
| $6_{16}$ | not selected | REJECTED |
| $7_{16}$ | not registered | REJECTED |
| $8_{16}$-$D_{16}$ | reserved | |
| $E_{16}$ | any other reason | REJECTED |
| $F_{16}$ | no information | INTERIM |

FIG. 35

| Value | input_plug |
|---|---|
| $00_{16}$-$1E_{16}$ | Serial Bus plug zero-30 |
| $1F_{16}$-$7E_{16}$ | Reserved for future specification |
| $7F_{16}$ | Not applicable |
| $80_{16}$-$9E_{16}$ | External plug zero-30 |
| $9F_{16}$-$FD_{16}$ | Reserved for future specification |
| $FE_{16}$ | Invalid |
| $FF_{16}$ | not applicable for ACCEPTED responsue |

FIG. 36

| | msb | | | | | | | lsb |
|---|---|---|---|---|---|---|---|---|
| opcode | SIGNAL SOURCE($1A_{16}$) | | | | | | | |
| operand [0] | $FF_{16}$ | | | | | | | |
| operand [1] | $FF_{16}$ | | | | | | | |
| operand [2] | $FF_{16}$ | | | | | | | |
| operand [3] | signal_destination | | | | | | | |
| operand [4] | | | | | | | | |

FIG. 37

| | msb | | | | | | | lsb |
|---|---|---|---|---|---|---|---|---|
| opcode | SIGNAL SOURCE($1A_{16}$) | | | | | | | |
| operand [0] | output_status | | | conv | signal_status | | | |
| operand [1] | signal_source | | | | | | | |
| operand [2] | | | | | | | | |
| operand [3] | signal_destination | | | | | | | |
| operand [4] | | | | | | | | |

FIG. 38

| Value | output_status |
|---|---|
| $0_{16}$ | effective packet output |
| $1_{16}$ | not effetive |
| $2_{16}$ | insufficient resource |
| $3_{16}$ | ready |
| $4_{16}$ | virtual output |
| $5_{16}$ | reserved |

FIG. 39

| Value | Meanig |
|---|---|
| 0 | Format of Signal Outputted From Destination Plug Cannot be Changed |
| 1 | Format of Signal Outputted From Destination Plug Can be Changed |

FIG. 40

| msb | | | lsb |
|---|---|---|---|
| processed | fillltered | converted | OSD overlaid |

FIG. 41

| Value | source_plug_ID |
|---|---|
| $00_{16}$-$1E_{16}$ | Serial bus iPCR [0] -iPCR [30] |
| $1F_{16}$-$7F_{16}$ | Reserved |
| $80_{16}$-$9E_{16}$ | External input plug 0-30 |
| $9F_{16}$-$FB_{16}$ | Reserved |
| $FC_{16}$-$FE_{16}$ | Used for other purposes |
| $FF_{16}$ | Not applicable |

COMMUNICATION METHOD AND COMMUNICATION APPARATUS FOR DATA COMMUNICATION BETWEEN DEVICES CONNECTED BY A NETWORK

BACKGROUND OF THE INVENTION

1. Field of the Invention

The present invention relates to a communication method and a communication apparatus for use in executing data communication among devices connected by an IEEE (Institute of Electrical and Electronics Engineers) 1394 bus line, for example.

2. Description of the Related Art

Heretofore, there have been developed AV (audio-visual) devices capable of transmitting information to each other through a network using an IEEE 1394 serial data bus. When data is transmitted through this IEEE 1394 serial data bus, there are available an isochronous transfer mode used to transmit data of a relatively large capacity such as video data and audio data in real time and an asynchronous transfer mode used to transmit images, data and commands such as still pictures, text data and control commands highly-reliably, and exclusive bands for the isochronous transfer mode and the asynchronous transfer mode are available and used in transmission.

FIG. 1 of the accompanying drawings is a block diagram showing an example of a network system in which a source device, an input device and a controller are connected through this IEEE 1394 bus. As shown in FIG. 1, a source device a serving as a device for transmitting data, an input device b serving as a device for receiving data transmitted from the source device a and a controller c for controlling data transmission between the two devices a and b are connected to an IEEE 1394 bus d. When video data is transmitted between the two devices a and b under control of the controller c, between the two devices a and b under control of the controller c, transmission of data from the source device a to the input device b is started after the controller c had secured an isochronous transfer channel on the bus d and the two devices a and b had been connected with each other such that data can be transmitted through the isochronous transfer channel. The source device a or the input device b may be served as a controller as well.

When data is transmitted between the source device a and the target device b as described above, there can be applied a control command transmission system called an AV/C command (AV/C Command Transaction Set) which is applied to AV devices, or the like, for example. Details of the AV/C command are described in the AV/C Digital Interface Command Set General Specification which has been laid open in the 1394 Trade Association.

FIG. 2 shows an example of a manner in which data is transmitted among devices connected by an IEEE 1394 bus by using the AV/C command according to the related art. In this example according to the related art, four devices of a device serving as a controller, a first video deck, a second video deck and an audio deck are connected to the IEEE 1394 bus (different from the example shown in FIG. 1), and video data and audio data are dubbed between the two video decks under control of the controller. In this example, the video deck is a digital video recording and reproducing apparatus capable of recording and reproducing video data (and audio data accompanying the video data) on and from a magnetic tape in the form of digital data encoded by an MPEG (Moving Picture Experts Group) system. An audio deck is an audio recording and reproducing apparatus capable of recording and reproducing audio data on and from a magneto-optical disk called a mini disc (MD) after it had compression-coded audio data in a predetermined compression-coding system (i.e., ATRAC (Adaptive Transform Acoustic Coding) system).

First, the controller issues a command prescribed by the AV/C command to respective devices connected to the bus to determine if video data can be dubbed on the respective devices. Specifically, the controller transmits a subunit info command, which inquires a processing function section of a device, to the audio deck (step S71) and obtains data indicating that the video deck is a disc recorder/player by a response from the video deck (step 72).

Next, the controller transmits the same subunit info command to the first video deck (step S73) and obtains data indicating that the first video deck is a tape recorder/player from a response from the first video deck (step S74). When the controller obtains the response of the tape recorder/player, there is a possibility that this tape recorder/player will be a device on which video data can be dubbed. Hence, the controller transmits a tape playback format command inquiring a playback format to the first video deck (step S75) and obtains data indicating that the playback format is an MPEG video format from a response from the first video deck (S76).

The controller transmits the subunit info command to the second video deck (step S77) and obtains data indicating that the second video deck is a tape recorder/player from a response of the second video deck. When the controller obtains the response of this tape recorder/player, there is a possibility that this tape recorder/player will be a device on which video data can be dubbed. Hence, the controller transmits a tape playback format command inquiring a tape playback format to the second video deck (step 79) and obtains data indicating that the tape playback format is an MPEG video format from a response of the second video deck (step S80).

Next, the controller sends a tape recording format command inquiring a tape recording format to the second video deck (step S81) and obtains data indicating that the tape recording format is an MPEG video format from a response of the second video deck (step S82). Consequently, the controller can determine that the second video deck is a recording device.

After these commands had been exchanged so far, the controller can execute the dubbing processing in which the controller can determine that the first video deck is the reproducing device and that the second video deck is the recording device and video data reproduced from the magnetic tape of the first video deck is transmitted to the second video deck and recorded on the magnetic tape by the second video deck.

Since it is determined by the controller based on the processing executed so far that the MPEG video data can be dubbed between the first and second video decks, a point-to-point connection for connecting the two devices is established under control of the controller such that data can be transmitted between the two devices by the isochronous transfer channel on the IEEE 1394 bus.

After the point-to-point connection has been established and the transmission line on the bus has been secured, the controller transmits a record command for starting the recording to the second video deck (step S83) and receives from the second video deck a response indicating that the above command processing was accepted (step S84). The controller transmits a playback command for starting the playback to the first video deck (step S85) and receives from the first video deck a response indicating that the above command processing was accepted (step S86). After the above processing has been executed so far, MPEG video data (stream data) played back from the first video deck can be transmitted to the second video deck by the isochronous transfer channel secured on the bus and thereby recorded on the magnetic tape by the second video deck.

With the above processing executed so far as shown in FIG. 2, the connection can be established on the network comprising the bus by the transmission of control commands such as the AV/C command and the stream data such as the video data and the audio data can be transmitted among the devices.

FIG. 2 shows the state in which all the devices concerning the data transmission could be operated satisfactorily. However, if the response to the command instructed in any of the status is not in accordance with the instruction, then the transmission processing of stream data will be interrupted at that time. Furthermore, the communication apparatus according to the related art does not include means for confirming whether the data transmission is executed correctly or not. Accordingly, when the transmission of the stream data is started as shown in FIG. 2, it is important to determine by confirming beforehand the statuses of the source device and the input device whether or not the source device is able to transmit stream data and whether or not the input device is able to receive transmitted stream data.

However, in the transmission processing on this kind of network according to the related art, it is impossible to check in detail whether or not the communicated device is able to handle the transmitted stream data.

SUMMARY OF THE INVENTION

In view of the aforesaid aspect of the present invention, it is an object of the present invention to provide a communication method and a communication apparatus in which when stream data is transmitted in a network such as an IEEE 1394 network, other device on the network can easily determine whether or not an output device side is ready to output stream data and whether or not an input device side is ready to receive transmitted stream data.

According to an aspect of the present invention, when an input device receives stream data outputted from an output device connected to a predetermined network, if the output device or other devices transmit a command for requesting the input device to enable its data input section to input outputted data of the output device, then data indicating that input setting is temporarily disabled is prepared as a response issued from the input device to the above command. When the source device which issues the above command receives the data indicating that the input setting is temporarily disabled, the source device executes corresponding processing.

According to the such first invention, when the input device side cannot execute input setting of stream data due to some causes, the device side which controls transmission of stream data on the network can understand the status in which the input device side is placed at present and can execute corresponding processing.

According to the second invention, when an input device receives stream data outputted from an output device connected to a predetermined network, if the output device or other devices transmit a first command for requesting the input device to enable its data input section to input outputted data of the output device, then after it has been confirmed by a response based on the first command whether or not a connection within the input device has been completed such that the input device can stream data and whether or not a connection between the output device and the input device on the network has been completed, the output device or other devices transmit a second command for executing predetermined confirmation concerning that the input device is ready to input the outputted data. If it is determined by the response based on the second command that the input device is ready to input the outputted data, then the output device starts transmitting stream data.

According to the such second invention, the device side which controls transmission of stream data on the network can understand that the input device side is ready to input stream data and can properly control transmission of stream data.

BRIEF DESCRIPTION OF THE DRAWINGS

FIGS. 9A, 9B and 9C are explanatory diagrams showing examples of AV/C command and response in concrete, wherein FIG. 9A shows an example of ctype/response in concrete, FIG. 9B shows an example of subunit type in concrete, and FIG. 9C shows an example of operation code (op code) in concrete;

FIG. 10 is an explanatory diagram showing an example of an input select control command according to the first embodiment of the present invention;

FIG. 11 is an explanatory diagram showing an example of plug ID according to the first embodiment of the present invention;

FIG. 12 is an explanatory diagram showing an example of path change field data according to the first embodiment of the present invention;

FIG. 13 is an explanatory diagram showing an example of an input select control response according to the first embodiment of the present invention;

FIG. 14 is an explanatory diagram showing an example of plug ID according to the first embodiment of the present invention;

FIG. 15 is an explanatory diagram showing examples of result status data according to the first embodiment of the present invention;

FIG. 16 is an explanatory diagram showing an example of an input select status command according to the first embodiment of the present invention;

FIG. 17 is an explanatory diagram showing an example of an input select status response according to the first embodiment of the present invention;

FIG. 18 is an explanatory diagram showing an example of status data according to the first embodiment of the present invention;

FIG. 28 is an explanatory diagram showing an example of input select control command according to the second embodiment of the present invention;

FIG. 29 is an explanatory diagram showing examples of subfunctions according to the second embodiment of the present invention;

FIG. 30 is an explanatory diagram showing examples of output plug field data according to the second embodiment of the present invention;

FIG. 31 is an explanatory diagram showing an example of signal destination plug field data (obtained when an operand [6] is allocated to FF) according to the second embodiment of the present invention;

FIG. 32 is an explanatory diagram showing an example of signal destination plug field data (obtained when the operand [6] is allocated to other values than FF);

FIG. 33 is an explanatory diagram showing an example of a data arrangement of input select control response according to the second embodiment of the present invention;

FIG. 34 is an explanatory diagram showing an example of result status data according to the second embodiment of the present invention;

FIG. 35 is an explanatory diagram showing an example of a data arrangement of input plug ID according to the second embodiment of the present invention;

FIG. 36 is an explanatory diagram showing an example of a data arrangement of a signal source status command according to the second embodiment of the present invention;

FIG. 37 is an explanatory diagram showing an example of a data arrangement of a signal source status response according to the second embodiment of the present invention;

FIG. 38 is an explanatory diagram showing an example of output status data according to the second embodiment of the present invention;

FIG. 39 is an explanatory diagram showing an example of conv (conversion) data according to the second embodiment of the present invention;

FIG. 40 is an explanatory diagram showing an example of signal status data according to the second embodiment of the present invention;

FIG. 41 is an explanatory diagram showing an example of signal source input plug data according to the second embodiment of the present invention;

DESCRIPTION OF THE PREFERRED EMBODIMENTS

A communication method and a communication apparatus according to a first embodiment of the present invention will be described below with reference to FIGS. 3 to 24.

Figure 1:
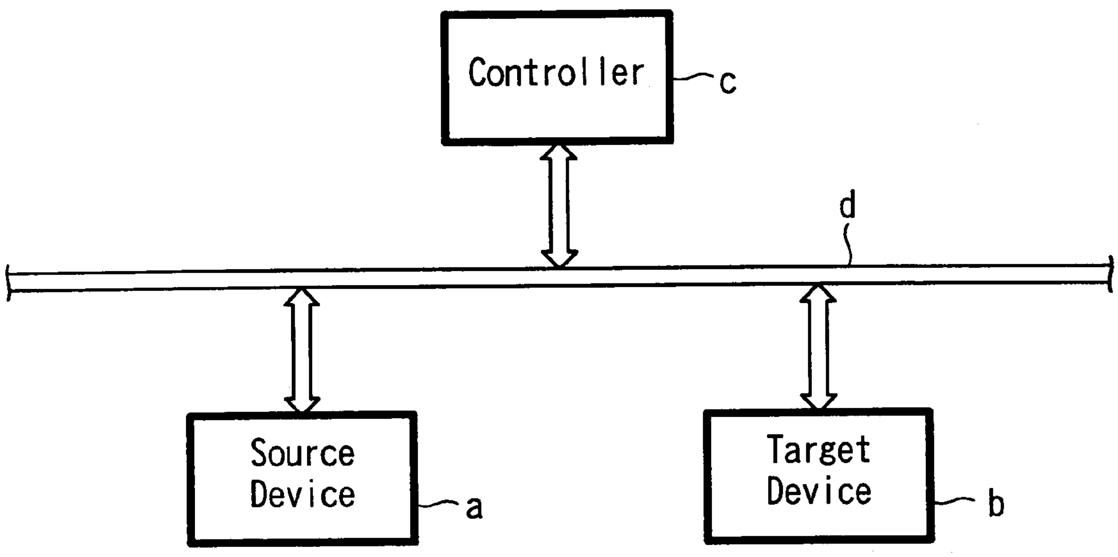
FIG. 1 is a block diagram showing an example of a network system according to the related art.
Figure 2:
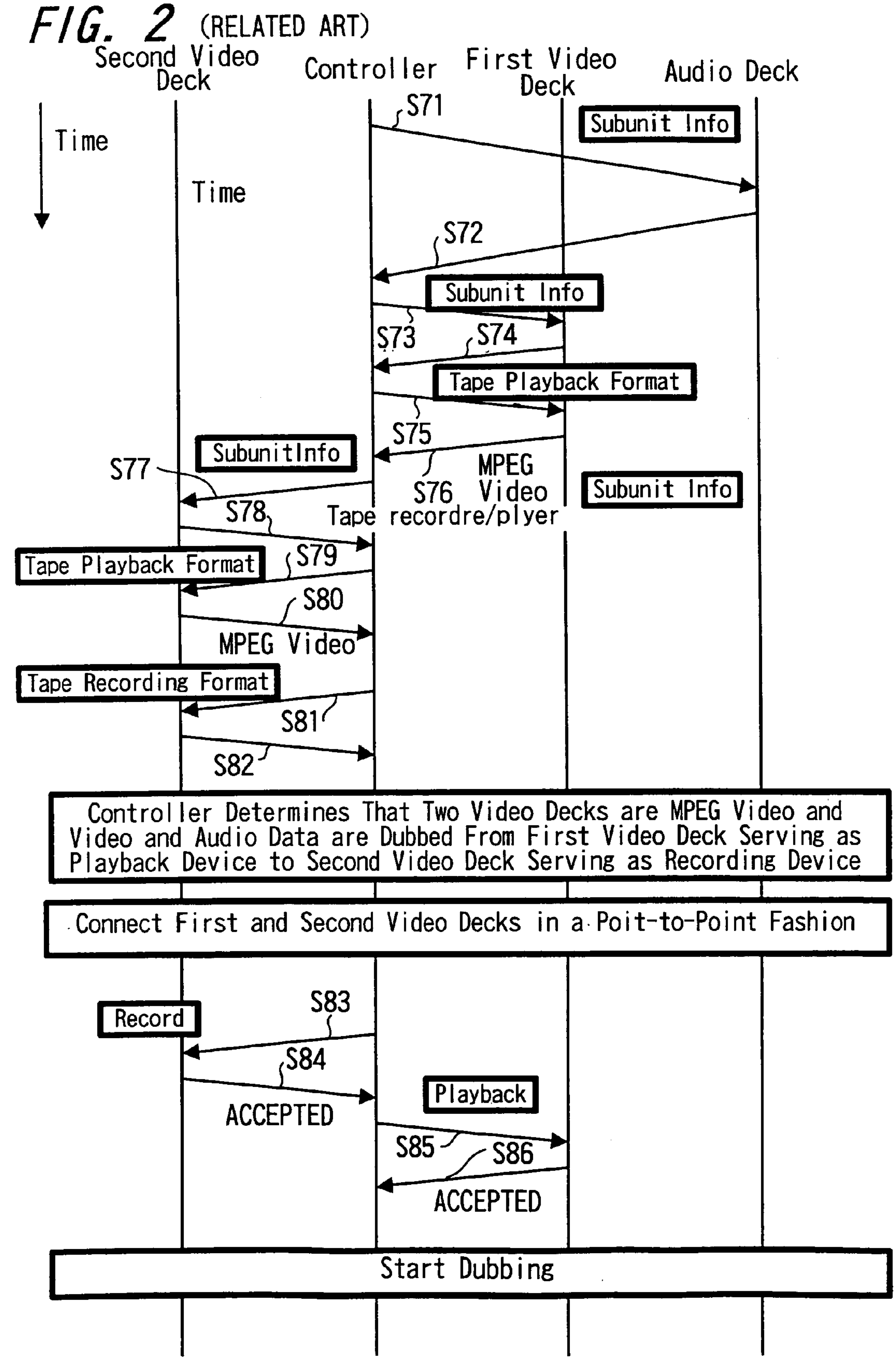
FIG. 2 is a flowchart to which reference will be made in explaining the manner in which a connection is processed by an AV/C command according to the related art.
Figure 3:
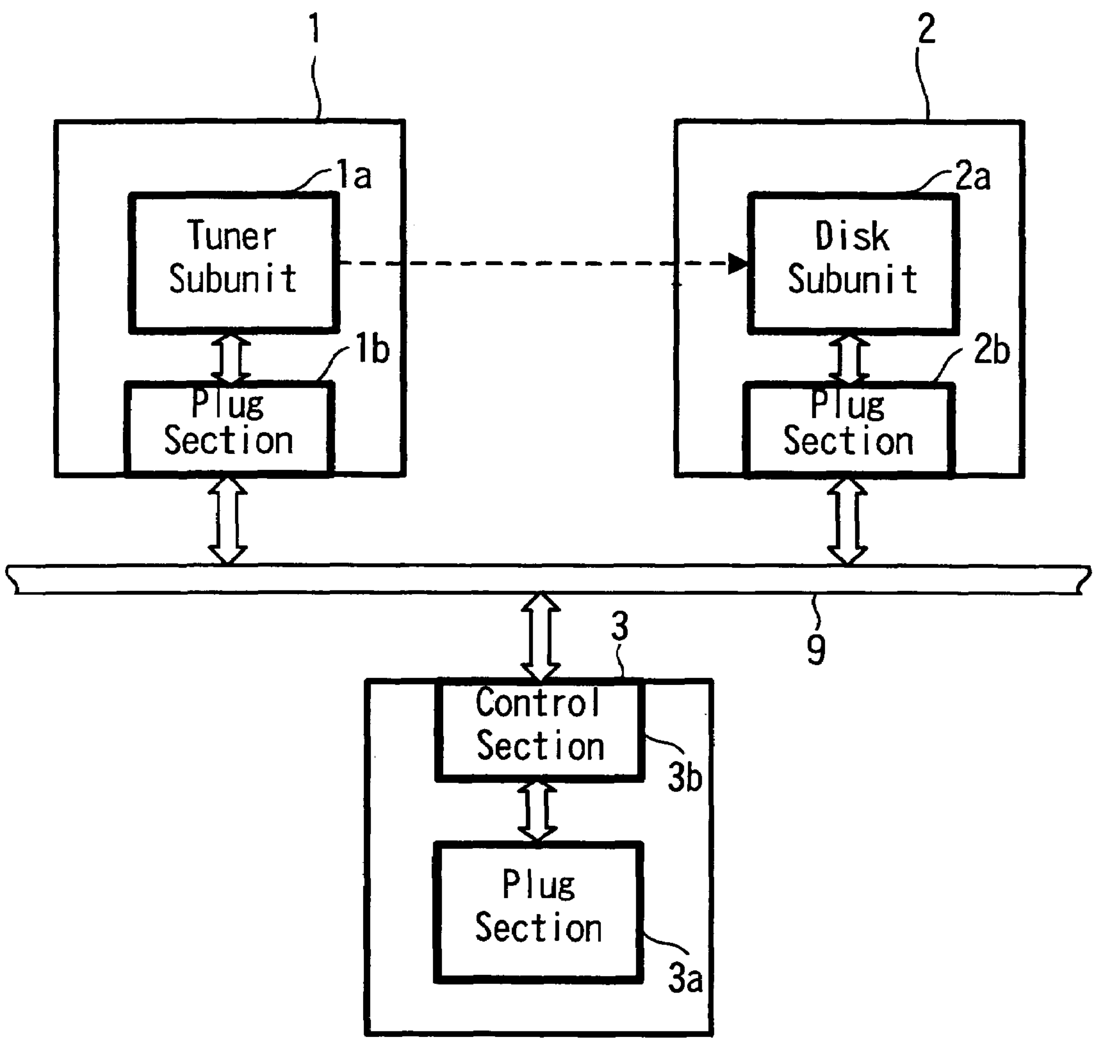
FIG. 3 is a block diagram showing an example of an arrangement of a system according to a first embodiment of the present invention.

An example of an arrangement of a network system to which the present invention is applied will be described with reference to FIG. 3. This network system comprises a plurality of devices connected to an IEEE 1394 serial data bus 9 (the IEEE 1394 serial data bus 9 will hereinafter be referred to as a "bus 9" for simplicity). Specifically, as shown in FIG. 3, an IRD (Integrated Receiver Decoder: digital satellite broadcast receiving apparatus) 1, an audio deck (audio recording and reproducing apparatus) 2 and a device having a controller function (this device will be referred to as a "controller device") 3 are connected to the bus 9. Each device is provided with an IEEE 1394 bus connection terminal and implements a function so that it can be controlled by the AV/C command. The control device 3 is adapted to control transmission of data on the bus 9 and AV-devices such as the IRD 1 may be served as the control device as well. In some case, other devices than the AV-devices such as a personal computer may be connected to the bus 9.

Each of the devices 1, 2, 3 can be regarded as a device which includes a subunit for executing processing to realize each function and a plug section for inputting and outputting data between the bus 9 and the internal subunit from a functional standpoint prescribed by the AV/C command. Specifically, the IRD 1, for example, includes a tuner subunit 1*a* for receiving broadcasting, the audio deck 2 includes a disc subunit 2*a* for recording audio data on the disk and reproducing audio data from the disk, and the control device 3 includes a control unit 3*a* for executing a control function. The respective devices 1, 2, 3 include plug sections 1*b*, 2*b*, 3*b*. The respective plug sections 1*b*, 2*b*, 3*b* implement a plurality of plugs thereon so that the plug sections 1*b*, 2*b*, 3*b* can be connected to a plurality of channels on the bus 9. A relationship between the plug and the channel will be described later on.

Figure 4:
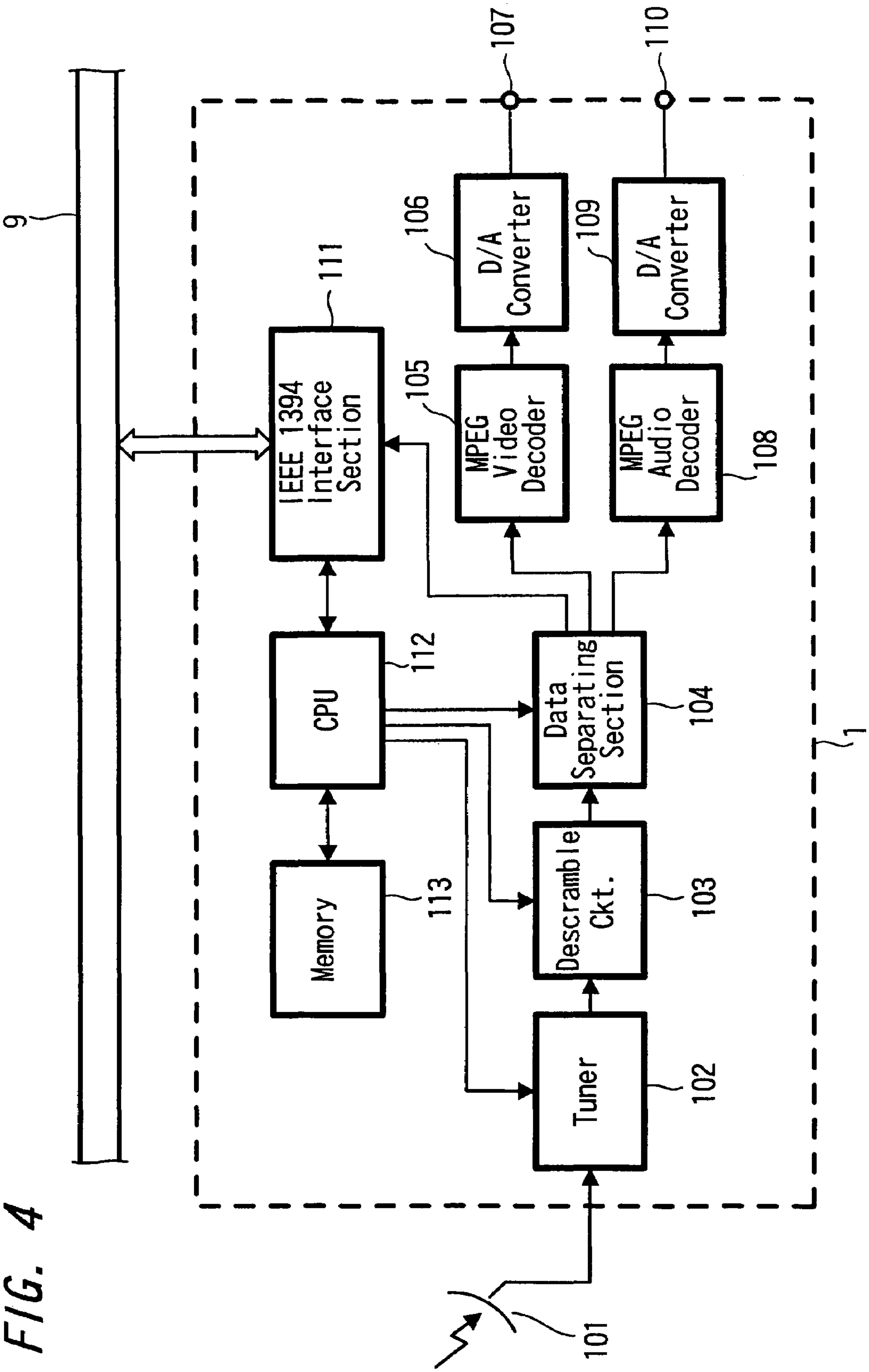
FIG. 4 is a block diagram showing an example of an internal arrangement of an IRD (integrated receiver decoder) according to the first embodiment of the present invention.

FIG. 4 shows in block form an example of the internal arrangement of the IRD 1. The IRD 1 is a digital satellite broadcasting receiver in which a broadcast wave of a predetermined channel can be received by channel-selecting a signal received by an antenna 101 connected thereto from a tuner 102. The signal thus channel-selected by the tuner 102 is supplied to a descramble circuit 103, in which it is processed for descrambling broadcast data. The data thus descrambled is supplied to a data separating circuit 104 and thereby desired data is extracted from multiplexed data of one channel.

The video data separated from the multiplexed data by the data separating circuit 104 is supplied to an MPEG video decoder 105, in which it is decoded according to the MPEG system. The video data thus decoded by the MPEG video decoder 105 is supplied to a digital-to-analog converter (D/A converter) 106, in which it is converted into an analog video signal. The resultant analog video signal is supplied to an output terminal 107. The audio data separated from the multiplexed data by the data separating circuit 104 is supplied to an MPEG audio decoder 108, in which it is decoded according to the MPEG system. The audio data thus decoded by the MPEG audio decoder 108 is supplied to a digital-to-analog converter (D/A converter) 109, in which it is converted into an analog audio signal. The resultant analog audio signal is supplied to an output terminal 110.

The IRD 1 according to this embodiment includes an IEEE 1394 interface section 111 from which received MPEG video data and audio data can be transmitted to the bus 9 connected thereto. When the IRD 1 receives a broadcast wave of a channel in which ATRAC (Adaptive Transform Acoustic Coding) audio data can be obtained, the received ATRAC audio data that has been separated by the data separating section 104 can be transmitted from the IEEE 1394 interface section 111 to the bus 9. When the IRD 1 receives data of other data broadcasting channels, the IRD 1 can transmit the data thus received from the IEEE 1394 interface section 111 to the bus 9.

The IRD 1 receives data and transmits received data to the bus 9 under control of a central processing unit (CPU) 112. The IRD 1 transmits data from the IEEE 1394 interface section 111 to the bus 9 and receives data at the IEEE 1394 interface section 111 from the bus 9 under control of the CPU 112. The CPU 112 has a memory 113 connected thereto and which can store therein data necessary for control, or the like.

Figure 5:
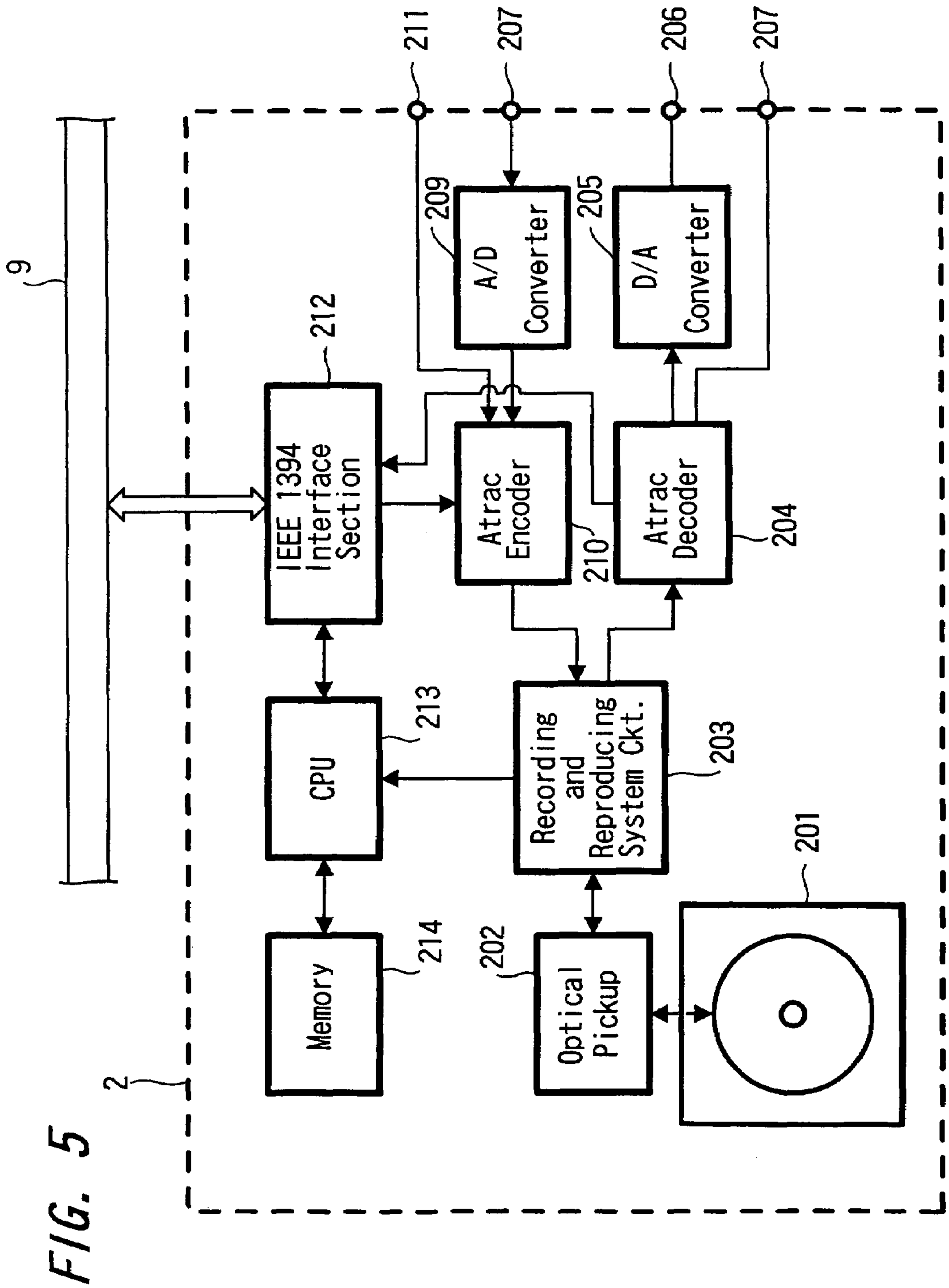
FIG. 5 is a block diagram showing an example of an internal arrangement of an audio deck according to the first embodiment of the present invention.

FIG. 5 shows in block form an example of an internal arrangement of the audio deck 2. The audio deck 2 according to this embodiment is an audio recording and reproducing apparatus in which audio data is encoded by a predetermined compression-coding system (e.g., ATRAC system) and recorded on and reproduced from a medium such as a magneto-optical disk called a mini disc (MD).

Specifically, as shown in FIG. 5, an optical pickup 202 optically reads out a signal from a predetermined magnetooptical disk (or optical disk) 201. The signal thus read out is supplied to a recording and reproducing system circuit 203, in which it is processed to provide ATRAC reproduced data. Then, an ATRAC decoder 204 decodes the ATRAC reproduced data to provide original digital audio data. The resultant original digital audio data is supplied to a digital-to-analog converter (D/A converter) 205, in which it is converted from the digital audio signal to an analog audio signal and developed at an analog output terminal 206. The resultant analog audio signal can be supplied from the analog output terminal 206 to audio devices, or the like connected to the analog audio terminal 206. The digital audio data decoded by the ATRAC decoder 204 can be outputted from a digital output terminal 207. Further, ATRAC reproduced data supplied to the ATRAC decoder 204 (or reproduced data decoded by the ATRAC system) can be supplied to an IEEE 1394 interface section 213 by which it can be transmitted to the bus 9 connected to the audio deck 2.

The arrangement of the recording system of this audio deck 2 will be described next. As shown in FIG. 5, an analog audio signal supplied to an analog input terminal 208 is supplied to an analog-to-digital converter (A/D converter) 209, in which it is converted from the analog audio signal to digital audio data. The resultant digital audio data is supplied to an ATRAC encoder 210, and the ATRAC encoder 210 encodes the digital audio data to provide ATRAC encoded audio data. The ATRAC encoded audio data is supplied from the ATRAC encoder 210 to the recording and reproducing system circuit 203, in which it is processed to provide a recording signal which will be supplied to the optical pickup 202. This recording signal can be recorded on the magneto-optical disk 201 by the optical pickup 202. Digital audio data such as ATRAC digital audio data supplied from the bus 9 to the IEEE 1394 interface section 212 can be supplied through the ATRAC encoder 210 to the recording and reproducing system circuit 203 and thereby recorded on the magnetooptical disk 201.

Playback operation and recording operation in these circuits are executed under control of a central processing unit (CPU) 213. Moreover, data can be transmitted from the IEEE 1394 interface section 212 to the bus 9 and data can be received at the IEEE 1394 interface section 212 from the bus 9 under control of the CPU 213. The CPU 213 has a memory 214 connected thereto and which can store therein data necessary for control. Connection information such as point-to-point connection information may be stored in a part of storage area of this memory 214.

Figure 6:
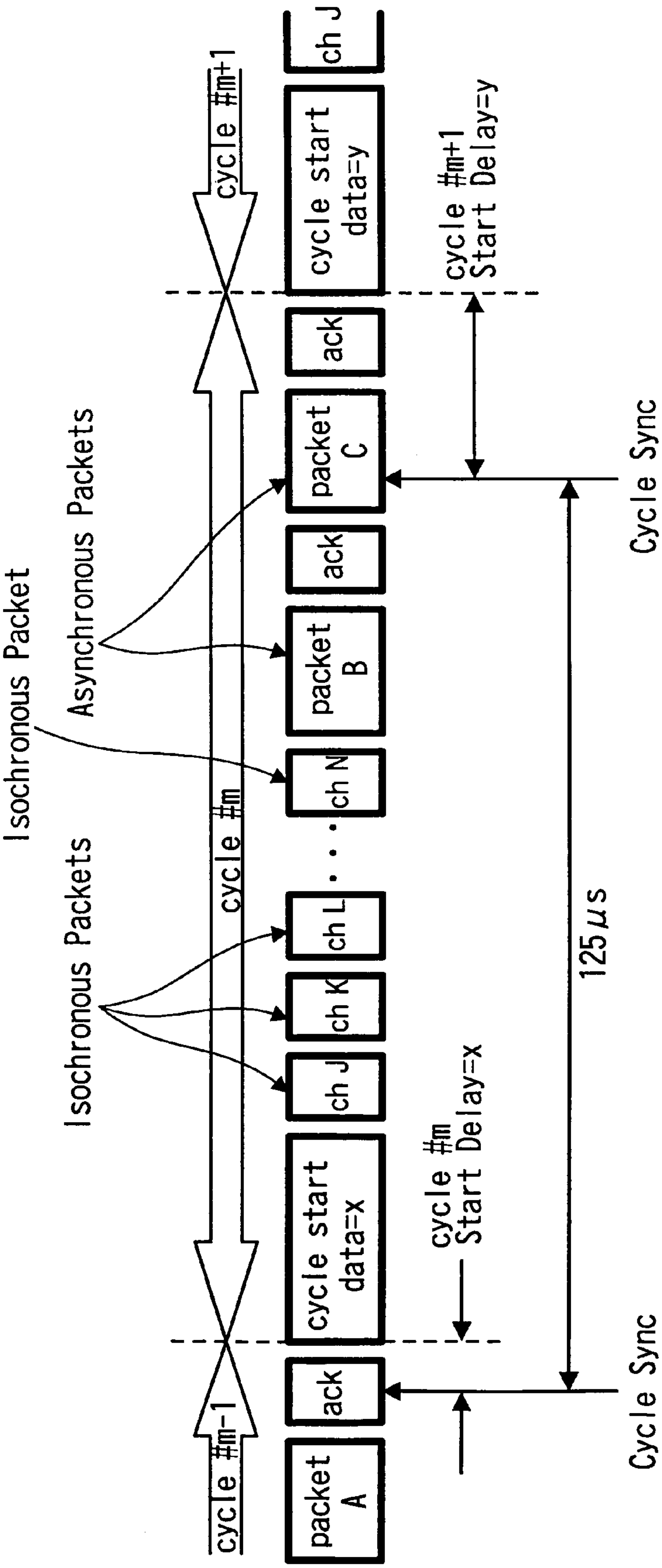
FIG. 6 is an explanatory diagram showing an example of a cycle structure used when a device connected by an IEEE 1394 bus transmits data.

Next, the manner in which data is transmitted through the IEEE 1394 bus 9 with the above respective devices connected thereto will be described. FIG. 6 is a diagram showing a data transmission cycle structure of a device connected according to the IEEE 1394 system. According to the IEEE 1394 system, data is divided into packets and transmitted in a time-division manner based on a cycle of a duration of 125 $\mu$S. This cycle is created by a cycle start signal supplied from a node having a cycle master function (i.e., any device connected to the bus). An isochronous packet source secures a band necessary for transmission (referred to as a "band" although it is a time unit) from the start of all cycles. Consequently, in the isochronous transmission, the transmission of data within a constant time period can be assured. However, if a transmission error occurs, then data will be lost because this data transmission cycle structure has no mechanism for protecting data from transmission errors. In the asynchronous transmission in which a node, which secures a bus as a result of arbitration in a time which is not available in the isochronous transmission of each cycle, transmits the asynchronous packet, although a reliable transmission is assured by using acknowledge and retry, a transmission timing cannot be made constant.

When a predetermined node transfers data in the isochronous transfer mode, such node has to be corresponding to the isochronous function. At least one of the nodes corresponding to the isochronous function has to have a cycle master function. Further, at least one of the nodes connected to the IEEE 1394 serial bus has to have an isochronous resource manager function.

Figure 7:
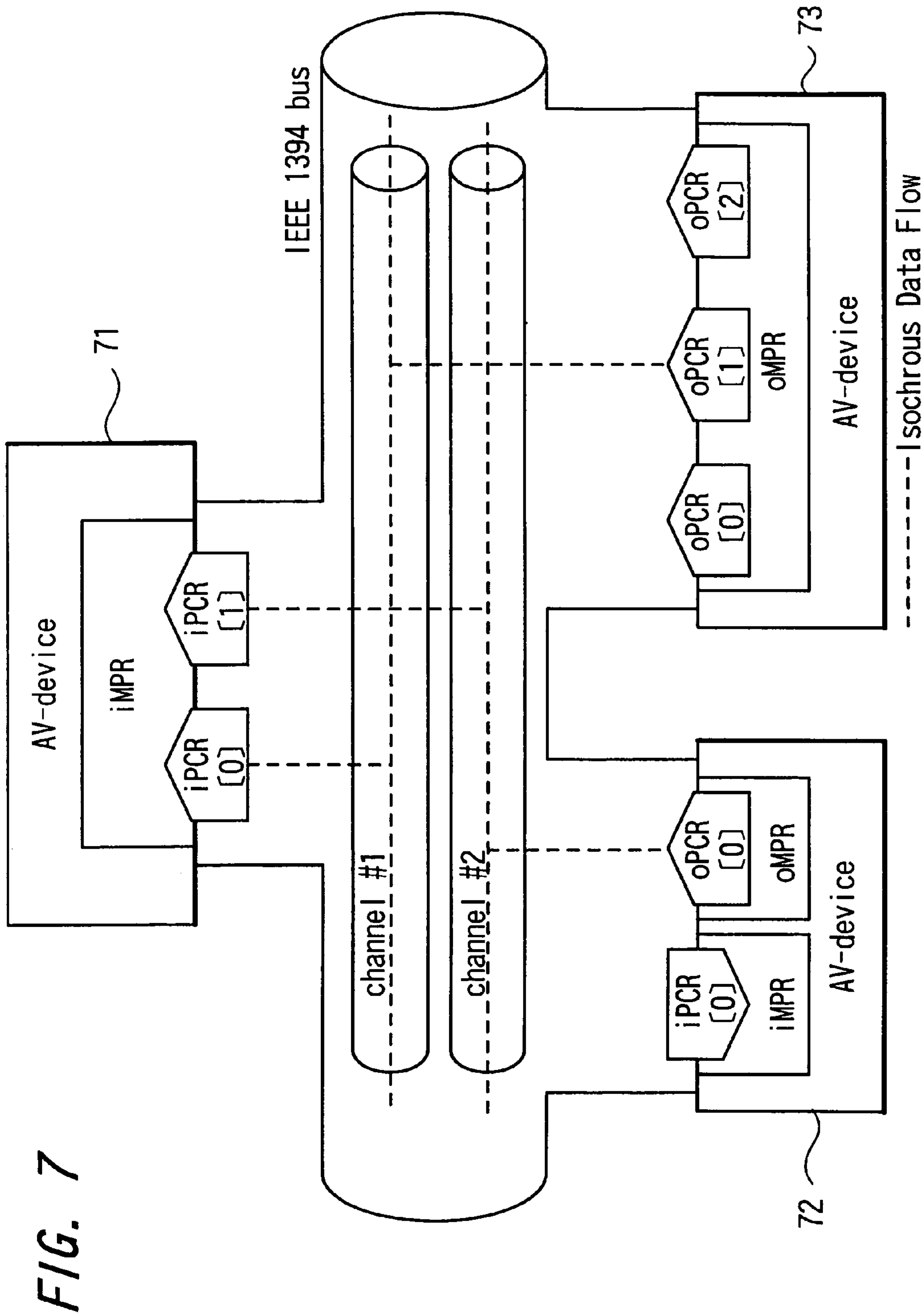
FIG. 7 is an explanatory diagram showing an example in which AV e devices are connected by the IEEE 1394 bus.

FIG. 7 is a diagram showing a relationship among a plug, a plug control register and isochronous channels. As shown in FIG. 7, AV devices 11 to 13 are connected together by the IEEE 1394 serial bus. Isochronous data whose channel was designated by an oPCR (output Plug Control Register) [1] of an oPCR [0] to an oPCR [2] in which the transmission speed and the number of oPCRs are prescribed by an oMPR (output Master Plug Register) of the AV device 13 is transmitted to the channel #1 of the IEEE 1394 serial bus. Based on an iPCR (input Plug Control Register) [0] out of the oPCR [0] and an iPCR [1] in which the transmission speed and the number of iPCRs were prescribed by an iMPR (input Master Plug Register) of the AV device 11, the AV device 11 reads isochronous data transmitted to the channel #1 of the IEEE 1394 serial bus. Similarly, the AV device 12 transmits isochronous data to a channel #2 designated by the oPCR [0], and the AV device 11 reads out isochronous data from the channel #2 designated by the iPCR [1].

Data transmitted from the output plug of the data transmission source device to the bus is set so as to be received at the input plug of the data reception device by using the channel thus secured. Processing for creating a connection by setting the channel and the plug is executed under control of the predetermined device (controller) connected to the bus.

In this manner, data is transmitted among the devices connected by the IEEE 1394 serial bus. The system according to this embodiment can control the respective devices and can judge the states by using the AV/C command prescribed as commands for controlling the devices connected through the IEEE 1394 serial bus. Data used in this AV/C command will be described below.

Figure 8:
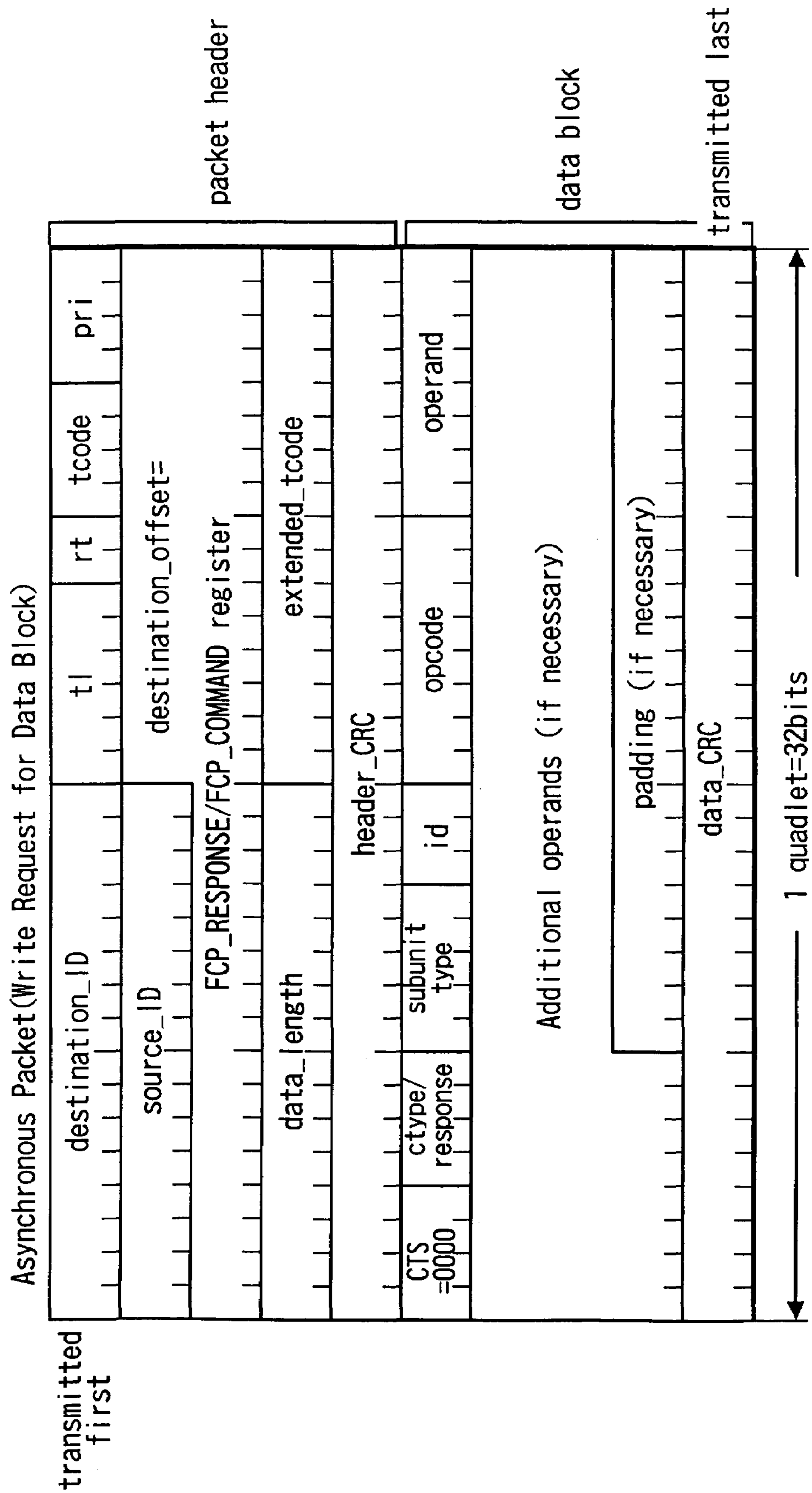
FIG. 8 is an explanatory diagram showing an example of an arrangement of data transmitted by an AV/C command.

FIG. 8 shows a data structure of packets transmitted in the asynchronous transfer mode of the AV/C command. The AV/C command is a command set used to control AV devices, and CTS (command set ID)=a "0000". An AV/C command frame and a response frame are transmitted and received between the nodes. In order to prevent a load from being imposed upon the bus and the AV devices, the response for the command should be transmitted within a duration of 100 ms. As shown in FIG. 8, data of asynchronous packet is comprised of 32 bits (=1 quadlet) in the horizontal direction. In FIG. 8, the upper stage shows a packet header, and the lower stage shows a data block. A destination ID shows a destination.

The CTS shows a command set ID and CTS="0000" in the AV/C command set. A ctype/response field shows a command function type when the packet is the command and shows a processed result of a command when the packet is the response.

Roughly classified, there are defined four types of commands wherein (1) a command (CONTROL) for controlling the functions from the outside, (2) a command (STATUS) for inquiring the status from the outside, (3) a command (GENERAL INQUIRY (whether or not the support of op code exists) and (SPECIFIC INQUIRY (whether or not the support of op code and operands exists)) for inquiring the existence of the support of the control command from the outside and (4) a command (NOTIFY) for notifying the change of the status to the outside.

Response messages are returned in response to the type of the command. Response messages for the CONTROL command are NOT IMPLEMENTED (not implemented), ACCEPTED (accepted), REJECTED (rejected) and INTERIM (interim). Response messages for the STATUS command are NOT IMPLEMENTED, REJECTED, IN TRANSITION (in transition) and STABLE (stable). Response messages for the GENERAL INQUIRY command and the SPECIFIC INQUIRY command are IMPLEMENTED (implemented) and NOT IMPLEMENTED (not implemented). Response messages for the NOTIFY command are NOT IMPLEMENTED, REJECTED, INTERIM and CHANGED (changed). Other commands and response messages than the above ones may be defined depending upon circumstances.

A subunit type is provided in order to specify functions within the device. For example, a tape recorder/player, tuner and the like are allocated to the subunit type. In order to discriminate a plurality of subunits of the same type, the addressing is executed by using the subunit id as a discrimination number. An op code (operation code) expresses a command and an operand expresses a parameter of a command. Additional operands are fields which should be added if necessary. A padding also is a field which should be added if necessary. A data CRC (Cyclic Redundancy Check) is used to check errors when data is transmitted.

FIGS. 9A to 9C show examples of the AV/C command in concrete. FIG. 9A shows examples of the ctype/response messages in concrete. In FIG. 9A, the upper stage expresses command messages and the lower stage expresses response messages. CONTROL is allocated to "0000", STATUS is allocated to "0001", SPECIFIC INQUIRY is allocated to "0010", NOTIFY is allocated to "0011" and GENERAL INQUIRY is allocated to "0100". "0101" to "0111" are reserved for future specification. NOT IMPLEMENTED is allocated to "1000", ACCEPTED is allocated to "1001", REJECTED is allocated to "1010", IN TRANSITION is allocated to "1011", IMPLEMENTED/STABLE is allocated to "1100", CHANGED is allocated to "1101" and INTERIM is allocated to "1111". "1110" is reserved for future specification.

FIG. 9B shows examples of subunit types in concrete. A Video Monitor is allocated to "00000". A Disk recorder/Player is allocated to "00011". A Tuner is allocated to "00101". A Video camera is allocated to "00111". A Vendor unique is allocated to "11100". A subunit type extended to next byte" is allocated to "11110". While a unit is allocated to "11111", this is used when it is transmitted to the device itself and might be the on/off of the power-supply, for example.

FIG. 9C shows examples of op codes in concrete. A table of op codes exists at every subunit type. FIG. 9C shows op codes obtained when the subunit type is the tape recorder/player. Operands are defined for every op code. VENDOR-DEPENDENT is allocated to "00h", SEARCH MODE is allocated to "50h", TIME CODE is allocated to "51h", ATN is allocated to "52h", OPEN MIC is allocated to "60h", READ MIC is allocated to "61h", WRITE MIC is allocated to "62h", LOAD MEDIUM is allocated to "C1h", RECORD is allocated to "C2h", PLAY is allocated to "C3h" and WIND is allocated to "C4h".

The devices connected to the bus are controlled by using the AV/C command thus prescribed, and data is transmitted between the devices connected by the bus under control using the AV/C command. In this embodiment, a command for controlling the input selecting state is prepared for an input device (target device) to which stream data can be inputted. This command packet may be transmitted from the output device which outputs corresponding stream data or the control device which controls data transmission between the output device and the input device.

FIG. 10 shows an example of a data arrangement of [op code] and [operand] of an input select control command which is this command. This data is located at the packet shown in FIG. 8. Since this command is command data for instructing control, the type of this command becomes [CONTROL]. Data of [INPUT SELECT] which is a corresponding command is located at the area of [op code]. An input plug ID of an input device is located at the area of [operand (0)]. A node ID is located at the area of [operands (1), (2)]. An output plug ID of an output device is located at the area of [operand (3)]. Path change data is located at the first bit of the area of [operand (4)]. A section ranging from 2 to 4 bits is reserved (portion shown by reserved in FIG. 10) and specific data (e.g., data "000") is located at the reserved area. A section ranging from 5 to 8 bits is not available by the command, and hence specific data (e.g., maximum value data "1111") is located at such interval.

Because the input plug ID of the input device is determined by the input device which received this command, a device which transmits this command (i.e., output device or control device) cannot identify the input plug ID of the input device at the stage in which the command is being transmitted. Hence, data with the maximum value is located at the input plug ID. At the output plug ID of the output device, there is located ID data of a plug by which stream data is outputted from the output device. FIG. 11 is a diagram showing an example of a data arrangement of this plug ID. As shown in FIG. 11, individual IDs are assigned to 31 serial bus plugs of [0] to [30] and 31 external output plugs of [0] to [30], for example. The external output plugs are plugs which do not use the bus 9. A portion shown as Reserved in FIG. 11 is a portion of a data value in which a plug ID is reserved.

Path change data is data required when the controller instructs the change of a transmission line in somewhere of transmission of stream data. For example, when it becomes necessary to change data outputted from the output device in the form of digital data to an analog signal, the transmission line using the bus should be changed (i.e., path change) to an external analog transmission line. At that time, the controller instructs that the input device selects input by using this path change data when the path change occurs. To be more concrete, as shown in FIG. 12, for example, in the case of a command for instructing the ordinary input selection, path change data is set to "0". In the case of a command for instructing the input selection to change the path, path change data is set to "1".

When the packet of the command shown in FIG. 10 is transmitted to the input device, the input device returns a response message to the control command to the source which transmits the command. FIG. 13 shows an example of data arrangement of [op code] and [operand] of the input select control response which is the response to the control command. This data is located at the packet shown in FIG. 8. As shown in FIG. 13, data of [INPUT SELECT] which is the corresponding command is located at the area of [op code]. An input plug ID of an input device is located at the area of [operand (0)]. A connected node ID is located at the area of [operand (1) (2)]. A connected output plug ID is located at the area of [operand (3)]. Path change data is located at the first bit of the area of [operand (4)]. A section ranging from 2 to 4 bits is reserved (portion shown as reserved in FIG. 13) in which specific data (e.g., data "000") is located. Status data [result status] indicating the status of the input device is located at the section ranging from 5 to 8 bits.

Data that has been located at the command is located at the area of [operands (1) to (3)] as it is. Data that had been located at the command is similarly located at the section ranging from 1 to 4 bits in the area of [operand (4)] as it is. When the input device sets an input plug, ID of its input plug is located at the area of [operand (0)].

FIG. 14 is a diagram showing an example of data on this input plug ID. As shown in FIG. 14, 31 individual IDs are assigned to 31 serial bus plugs from [0] to [30] and 31 external output plugs from [0] to [30]. This input plug ID is indicated when data is response [ACCEPTED] which is the response indicating that the input device should accept the instruction of the command. There is also prepared data (data of maximum value FF) which is used when the response is of other types.

The status data [result status] indicative of the status of the input device is defined as shown in FIG. 15, for example. When this status data is in use, the response types are not limited to responses [ACCEPTED] which accept the instruction of the command, and responses [REJECTED] which reject the instruction of the command and responses [INTERIM] which are interim responses are available as the response type. A plurality of data values are set at every type of response.

Let us describe the respective response types from above of FIG. 15 sequentially. In the case of the response [ACCEPTED] which accepts the instruction of the command, there are available the following four data:

1. [succeeded] Data:

This data can indicate that the instruction of the command succeeded.

2. [ready] Data:

This data can indicate that the input device is placed in the standby mode due to some cause although a connection has been completed in the inside of the input device such that stream data can be inputted to the input device.

3. [busy] Data:

This data can indicate that data cannot be inputted due to other causes of the input device after the connection has already been completed in the inside of the input device such that stream data can be inputted to the input device and after a connection between the output device and the input device on the network has already been completed.

4. [failed] Data:

This data can indicate that a connection between the output device and the input device on the network is failed although a connection has already been completed in the inside of the input device such that stream data can be inputted.

In the case of responses [REJECTED] which reject the instruction of the command, there are available the following 8 data.

1. [disabled] Data:

This data can indicate that a mode for prohibiting the input setting from being executed by a command from other device.

2. [locked] Data:

This data can indicate that operation of the input device is locked due to some causes (e.g., during recording) so that the input setting cannot be made.

3. [p-to-p] Data:

This data can indicate that an input plug has no vacant space and a connection cannot be established because a connection has already been established under control of other device.

4. [insufficient resource] Data:

This data can indicate that a connection cannot be established because a band (channel) on the bus is insufficient.

5. [source not found] Data:

This data can indicate that the designated output plug of the output device (source device) cannot be found.

6. [not selected] Data:

This data can indicate that a designated path cannot be set. This data is used when a path cannot be changed to the path designated by the path change data.

7. [not registered] Data:

This data can indicate that the designated path has already been registered. This data also is used when a designated plug is not available for designated path change data.

8. [any other reason] Data:

This data is used to reject a command due to any other reason.

In the case of response [INTERIM] which is the interim response to the command, there are available the following two data.

1. [no information] Data:

This data is data temporarily transmitted when a response cannot be made due to some cause within a time period (e.g., 100 milliseconds) prescribed by the AV/C command.

2. [busy] Data:

This data is data temporarily transmitted when a response cannot be made due to some causes within a time period (e.g., 100 milliseconds) prescribed by the AV/C command. If this data is received, then it can be determined that the device is placed in the normal state after a previously-determined constant time (e.g., 10 seconds) has passed.

In addition to the control command shown in FIG. 10, there is available a status command which inquires the input selection state of the input device. FIG. 16 is a diagram showing an example of data arrangement of [op code] and [operand] of an input select status command which is this command. This data is located at the packet shown in FIG. 8. This command is data which inquires the status, and hence the command type becomes [STATUS]. Data on [INPUT SELECT] which is the corresponding command is located at the area of [op code]. An input plug ID of an input device is located at the area of [operand (0)], and the maximum value is located at all of the areas following [operand (1)].

When the packet of the command shown in FIG. 16 is transmitted to the input device, the input device returns the response for the status command to the source device which transmits the status command. FIG. 17 shows an example of a data arrangement of [op code] and [operand] of input select status response which is the response to the status command. This data is located at the packet shown in FIG. 8. As shown in FIG. 17, data of [INPUT SELECT] which is a corresponding command is located at the area of [op code]. An input plug ID of an input device is located at the area of [operand (0)]. A node ID of a connected source is located at the area of [operands (1) (2)]. An output plug ID of a connected source is located at the area of [operand (3)]. A section ranging from 1 to 4 bits of the area of [operand (4)] is reserved (shown as "reserved" in FIG. 17) in which specific data (e.g., data "000") is located. Status data [status] indicative of the status of the input device is located at a section formed of 5 to 8 bits.

The status data [status] indicative of the status of the input device is defined as shown in FIG. 18, for example. The status data will be described below. As the status data, there are available data indicating that a connection is established so that the input device is transmitting data, data indicating that a connection cannot be established because a band is insufficient, data indicating that a connection is established so that the input device is ready to transmit data, data indicating that a transfer format is incompatible and data indicating that an output device (source device) is not selected. Other values are reserved.

Next, transmission processing examples using the input select command having the above arrangement will be described with reference to FIGS. 19 to 24.

PROCESSING EXAMPLE 1

In this example, a stream data output device (source device) assumes an audio reproducing apparatus and an input device (target device) assumes a recording apparatus for recording audio data (stream data) reproduced and transmitted from the above audio reproducing apparatus. The above audio reproducing apparatus and the above recording apparatus correspond to the audio deck 2 shown in FIG. 5, for example. If the IRD can temporarily store therein audio data, then the IRD can become the source device. Then, under control of the source device, the input device side executes a connection management and the source device transmits audio data through a transmission line set by the above connection management.

Figure 19:
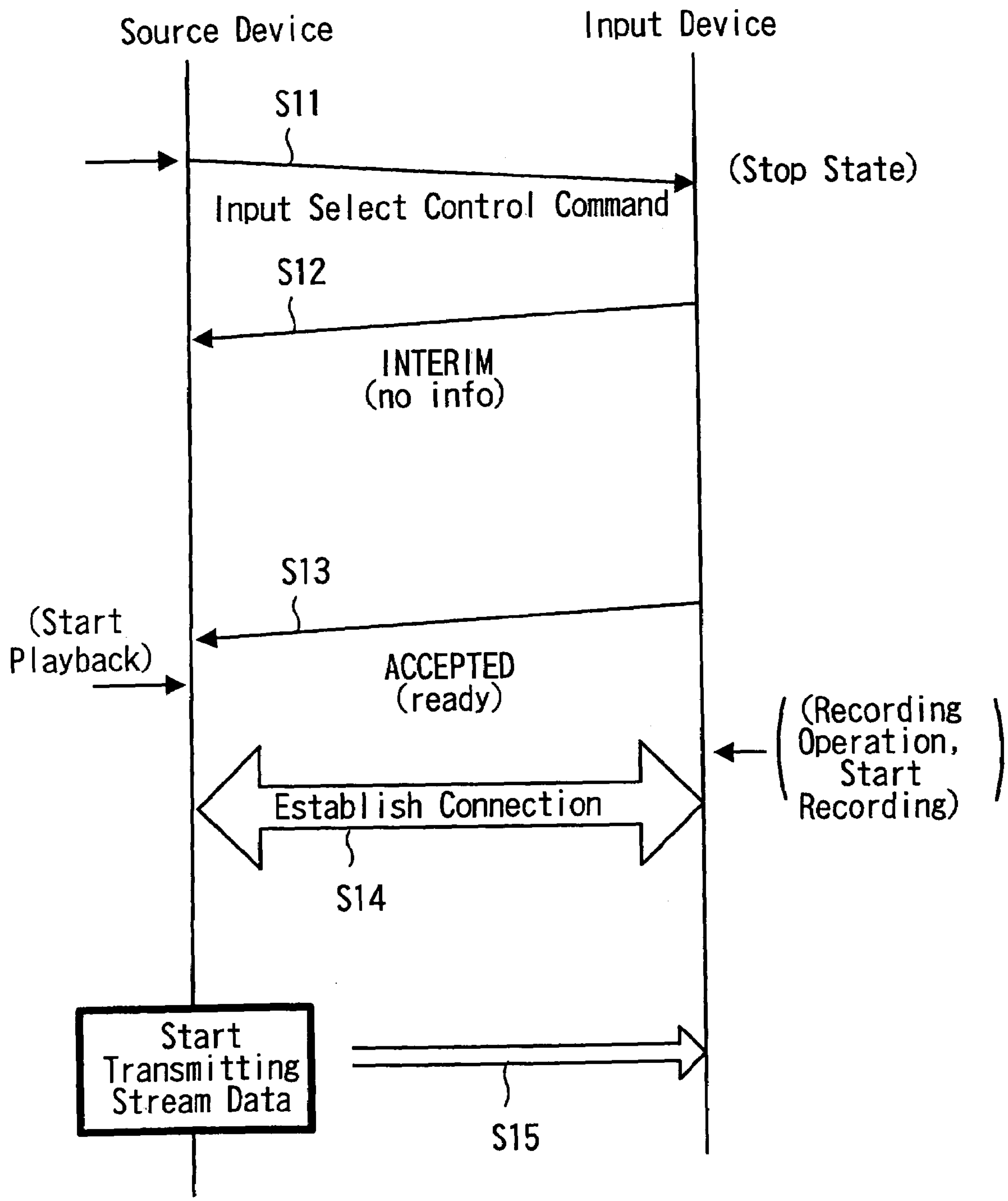
FIG. 19 is an explanatory diagram showing a processing example (processing example 1) according to the first embodiment of the present invention.

First, referring to FIG. 19, let us assume that the source device executes playback operation. Then, the source device transmits a input select control command to the input device (step S11) and transmits a connection management request command to the input device so that the input device can receive data outputted from the source device. Assuming that the input device is still placed in the stop state in which recording operation is not carried out, then a response from the input device is allocated to [INTERIM] data which is an interim response and [no information] is allocated to the status data (step S12). At the stage in which the input device side becomes ready for recording, a response from the input device is allocated to [ACCEPTED] data which is the response which answers the command and [ready] is allocated to the status data and thereby data indicating that the inside of the input device is ready for recording is transmitted to the source device (step S13). Thereafter, when recording start control is effected, the input device executes processing for establishing a point-to-point connection between it and the source device (step S14) and the source device starts transmitting audio data reproduced through the established point-to-point connection to enable the input device to record the received audio data (step S15).

When the recording is started as described above, the input device becomes able to receive and record data such as the audio data outputted from the source device without missing data. Therefore, it is possible to prevent a starting portion of audio data from being missed upon recording.

PROCESSING EXAMPLE 2

Figure 20:
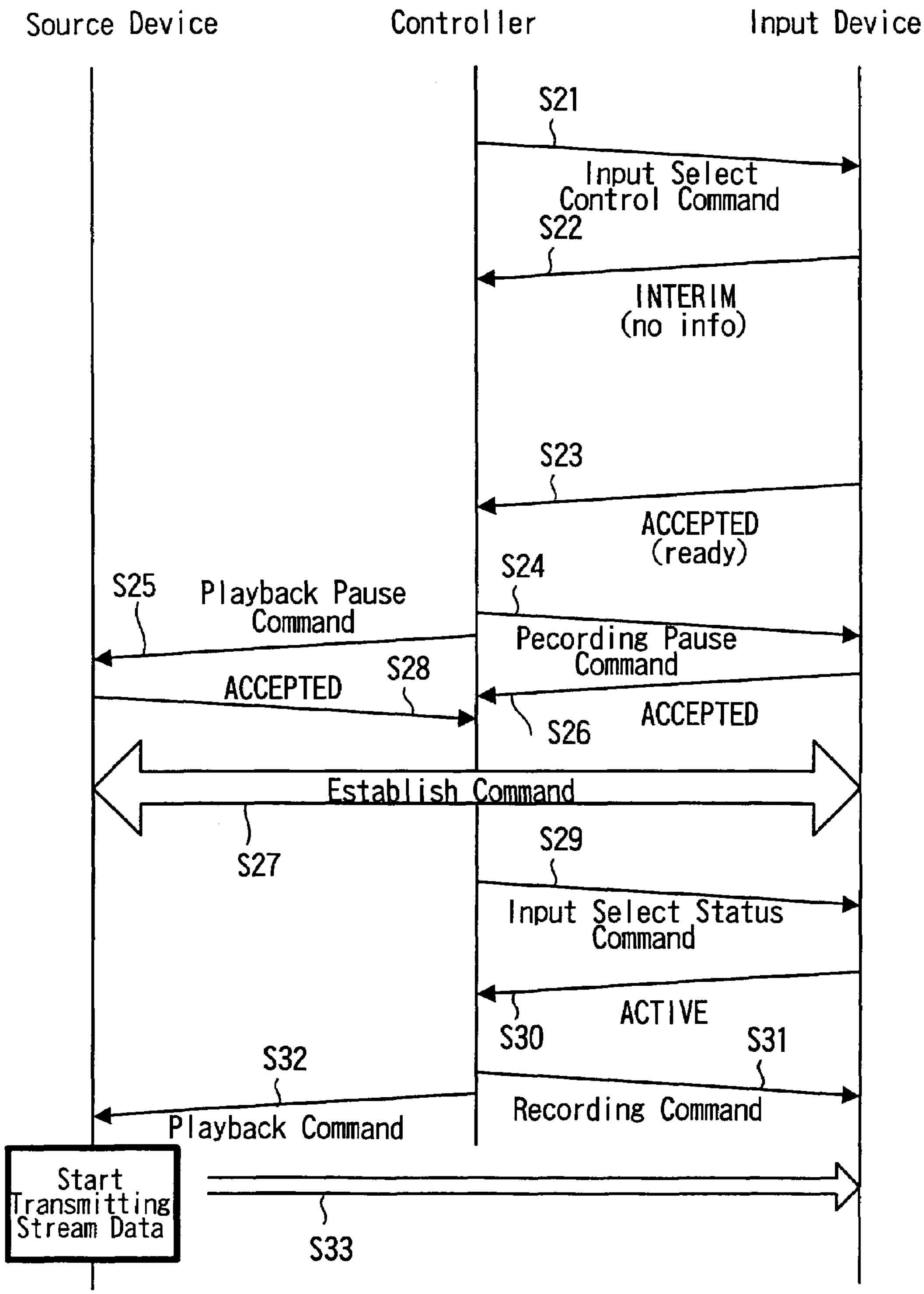
FIG. 20 is an explanatory diagram showing a processing example (processing example 2) according to the first embodiment of the present invention.

In this example, the input device executes the connection management under control of a controller (e.g., control device 3 shown in FIG. 3) on the bus. Referring to FIG. 20, first, the controller transmits an input select control command to the input device (step S21) and also transmits a connection management request command to the input device so that the input device can receive data outputted from the source device. Assuming that the input device is placed in the stop state in which recording is not executed, then a response from the input device is allocated to [INTERIM] data which is interim response data, and [no information] is allocated to status data (step S22). At the stage in which the input device side is ready for recording, [ACCEPTED] data is allocated to the response which answers the command and [ready] is allocated to the status data. Then, the input device transmits to the controller data indicating that the inside of the input device is ready for recording (step S23). When this data is transmitted, the controller transmits to the input device a recording pause command for placing the input device in the recording pause state (step S24). The controller transmits a playback pause command to the source device (step S25). Thereafter, the input device transmits a response (data [ACCEPTED]) for the recording pause command (step S26) and also executes processing to establish a point-to-point connection between it and the source device (step S27). The source device transmits a response (data [ACCEPTED]) for the playback pause command to the controller (S28).

The controller transmits the input select status command to the input device (step S29). If it is determined by the controller based on the response (S30) from the input device to the above command that the connection was completed, then the controller transmits a recording command to the input device (step S31) and transmits a playback command to the source device (step S329 successively to start transmission of stream data such as audio data from the source device and enables the input device to record the stream data (step S33). The source device may serve as the controller as well.

When the recording is started as described above, the input device becomes able to receive and record stream data such as audio data outputted from the source device without missing data while the connection is being executed under management of the input device. Therefore, similarly to the processing example 1, it is possible to prevent a starting portion of audio data from being missed upon recording.

PROCESSING EXAMPLE 3

In this example, it is assumed that stream data such as audio data is transmitted from an output device (source device) to an input device (target device). Then, the input device side executes a connection management under control of the source device and the source device transmits the stream data through the transmission line set by the above connection management.

Figure 21:
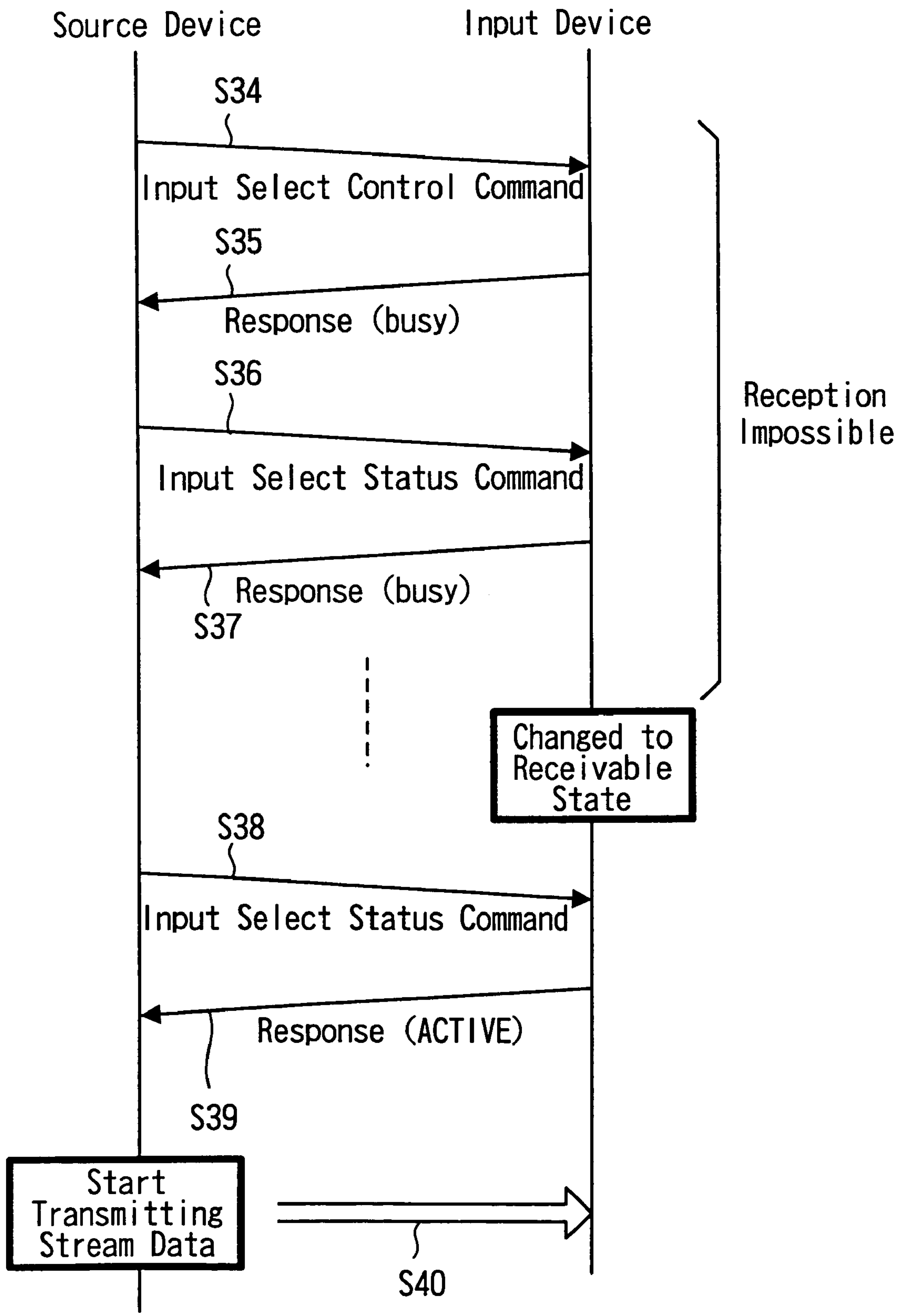
FIG. 21 is an explanatory diagram showing a processing example (processing example 3) according to the first embodiment of the present invention.

Referring to FIG. 21, first, the source device transmits an input select control command to the input device (step S34) and transmits to the input device a connection management request command such that the input device can receive data outputted from the source device. At that time, let us assume that the connection processing has already been completed in the input device (connection also was established) and that the input device is temporarily unable to receive stream data due to other causes. Then, [ACCEPTED] data is allocated to the response and [busy] is allocated to status data (step S35).

When the source device receives this response, the source device executes polling operation to successively inquire the status of the input device. Specifically, the source device successively transmits an input select status command to the input device at an interval of a certain period of time (step S36). Then, the response from the input device is confirmed by the source device (step S37). While this polling operation is being repeated, the input device is changed to the receivable state. At that time, if the source device can confirm the status change based on the response (step S39) to the input select status command (step S38) obtained after the input device had been changed to the receivable state, then the source device starts transmitting stream data through the available band (step S40).

When the stream data is transmitted like the processing example 3, if the input device side cannot temporarily receive data due to some causes and later on, the input device side becomes ready to receive data, then data can immediately be transmitted from the source device and transmitted to the input device. Therefore, data can satisfactorily be transmitted under the condition that the starting portion of transmitted stream data can be prevented from being missed.

While the input device executes the connection management in accordance with the command from the source device in the case of the processing example 3, the present invention is not limited thereto, and data can similarly be processed when the input device executes the connection management in accordance with command from other controller.

While the response is issued for the input select control command and the status is [busy] data in the processing example 3, the present invention is not limited thereto, and data can similarly be processed when the status is [failed] data. Specifically, when the status is [failed] data, this indicates the status that the connection within the input device has been completed such that the input device can input stream data but a connection between the output device and the input device on the network is failed. When the source device (or controller) judges that the status is [failed] data, it is repeatedly determined by the source device (or the controller) based on polling whether or not the connection between the output device and the input device on the network succeeded. If it is determined by the source device (or controller) that the connection between the output device and the input device on the network succeeded, then the source device can start transmitting stream data.

When the source device executes the polling operation, a predetermined time period in which the polling operation is repeated may be determined. If the predetermined time period elapsed, then the transmission may be judged as impossible and the transmission may be ended.

Further, instead of the polling operation, after a certain time period such as a time period required until the status of the input device becomes stable elapsed since the response for the status data [busy] has been issued, the source device side may start transmitting stream data without confirming the status of the input device.

PROCESSING EXAMPLE 4

In this example, let us assume that the output device (source device) transmits stream data such as audio data to the input device (target device). Then, under control of the source device, the input device executes the connection management and the output device transmits the stream data through the transmission line set by such connection management.

Figure 22:
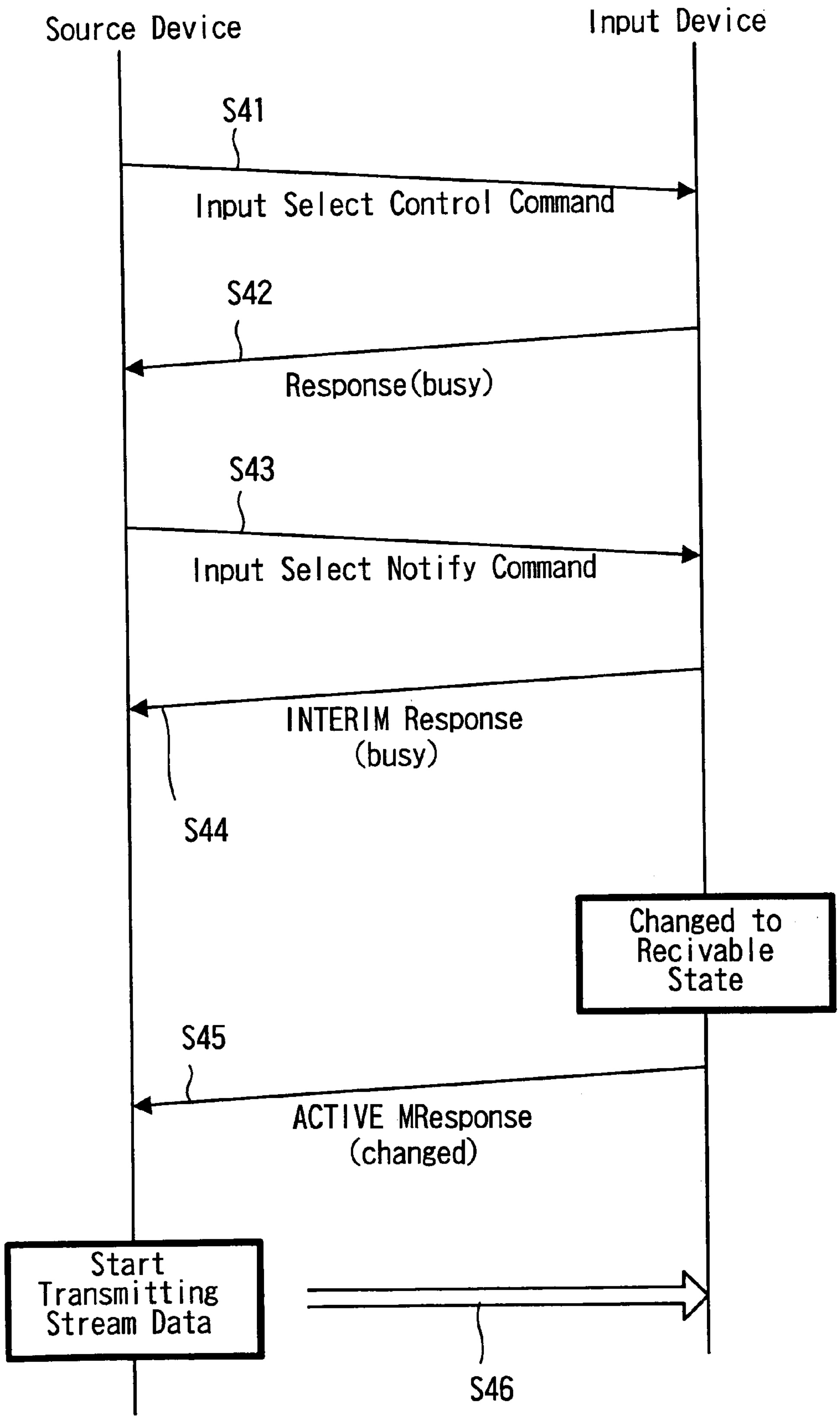
FIG. 22 is an explanatory diagram showing a processing example (processing example 4) according to the first embodiment of the present invention.
Figure 23:
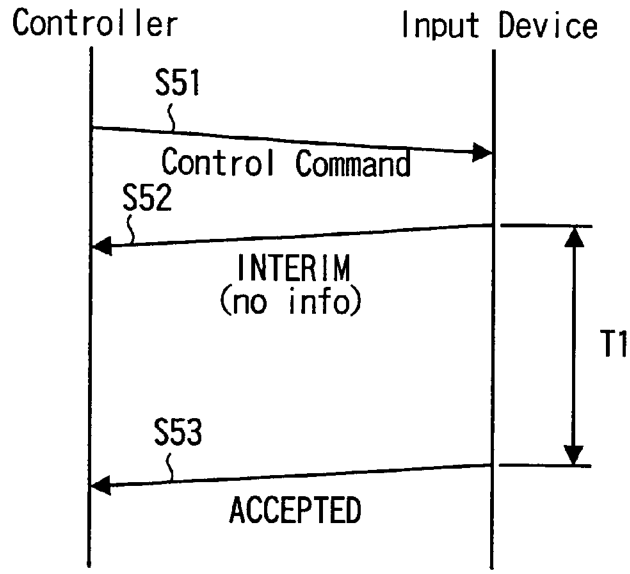
FIG. 23 is an explanatory diagram showing a processing example (processing example 5) according to the first embodiment of the present invention.
Figure 24:
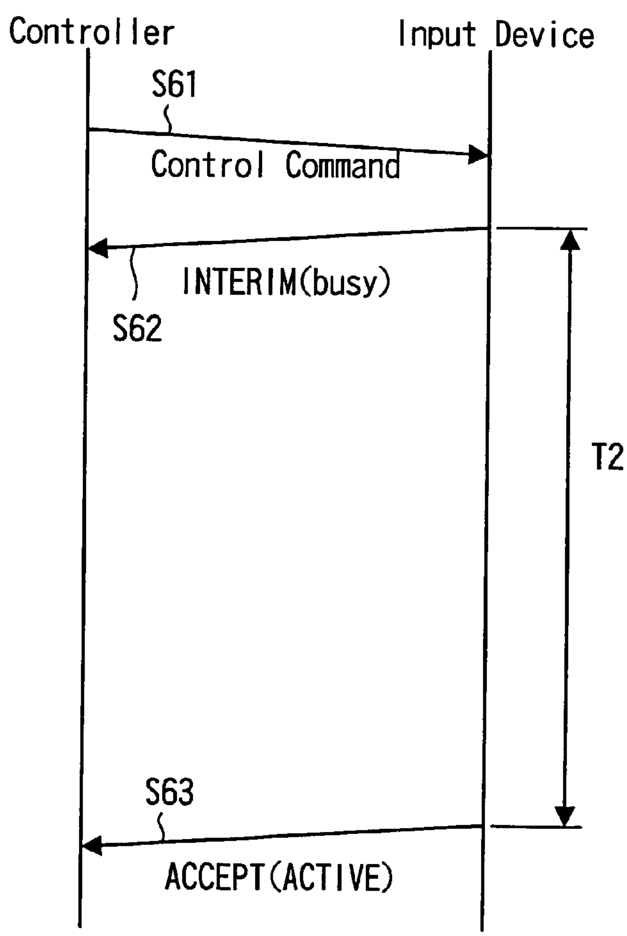
FIG. 24 is an explanatory diagram showing a processing example (processing example 6) according to the first embodiment of the present invention.

Referring to FIG. 22, first, the source device transmits input select control command to the input device (step S41) to transmit connection management request command in such a manner that the input device can receive data outputted from the source device. At that time, if the input device is temporarily unable to receive stream data due to other causes under the condition that the connection processing has been completed (connection has been established), then the input device issues response of [ACCEPTED] data and sets the status data to [busy] (step S42).

When the source device receives this response, the source device transmits input select notify command to the input device as a [NOTIFY] command which is the command for notifying that the source device becomes able to receive stream data (step S43). When the input device receives the input select notify command from the source device, the input device transmits [INTERIM] data which is the response notifying the reception of the input select notify command (step S44). At that time, the status data is allocated to [busy].

After the transmission has been executed so far, let it be assumed that the input device is changed to the receivable state. Then, the input device transmits to the source device the [ACTIVE] response for notifying that the input device is ready to receive data (step S45). At that time, a processed result of the [CHANGED] command indicating that the status was changed is added to the above response. If the source device confirms by this response the change of the status, then the transmission of stream data in the available band is started (step S46).

If the stream data is transmitted like the processing example 4, then when the input device side cannot temporarily receive data due to some cause, immediately after the input device becomes ready to receive data, data can be outputted from the source device and transmitted to the input device. In the case of the processing example 4, the source device need not monitor the status of the source device side. When the status of the input device is changed, there can be obtained the response automatically, and hence the processing on the source device side can be simplified.

While the input device executes the connection management under control based on the command issued from the source device in the case of the processing example 4, data may be processed similarly when the input device executes the connection management under control of command issued from other controllers different from the source device.

While the status data of the response to the input select control command is set to [busy] data in the processing example 4, the present invention can cope with the case in which status data is [failed] data by similar processing. Specifically, when status data is [failed] data, this is the status in which the connection between the output device and the input device on the network is failed although the connection within the input device has already been completed such that the input device can input stream data. If it is determined by the source device (or controller) that the above connection is failed, then the [NOTIFY] command is transmitted to notify that the status is changed. Then, if it is determined by the source device based on the response that the connection can be established, then the source device starts transmitting stream data.

PROCESSING EXAMPLE 5

In this example, the input device executes a variety of controls (connection management, etc.) by transmitting some command from the controller to the input device (target device).

First, the controller transmits to the input device a control command having any instruction (step S51). If the input device cannot answer the instruction immediately, then the response of the controller is set to [INTERIM] data which is the interim response and its status data is set to [no information] data (step S52). Then, when the input device can answer the control command, the input device transmits the [ACCEPTED] response to the controller (step S53).

T1 assumes a time period required by the input device to transmit the [ACCEPTED] response since the input device has transmitted the [INTERIM] response. This time T1 assumes to be 2 seconds, for example. At that time, the controller predicts that the time T1 in which the input device transmits the [ACCEPTED] response since the input device has transmitted the [INTERIM] response is about 2 seconds in advance. Based on this time T1, other controls such as transmission of stream data from the source device can be executed.

PROCESSING EXAMPLE 6

In this example, the input device can execute a variety of controls (connection management, etc.) by transmitting some command from the controller to the input device (target device) similarly to the processing example 5.

First, the controller transmits to the input device the control command having any instruction (step S61). If the input device cannot answer the above instruction immediately, then the response to the controller is set to [INTERIM] data which is interim answer and status data is set to [busy] data (step S62). The state in which this [busy] status data is added to the response is the state in which it takes a time longer than the ordinary time for executing processing corresponding to the instruction of the command. This state corresponds to the case in which it takes plenty of time to energize the input device which has been in the de-energized state. Then, when the input device can answer the control command, the input device transmits the [ACCEPTED] response to the controller (step S63).

In this case, T2 assumes a time period required by the input device to transmit the [ACCEPTED] response after the input device has transmitted the [INTERIM] response. This time T2 assumes to be about 10 seconds, for example. At that time, the controller predicts that the time T2 in which the input device transmits the [ACCEPTED] response since the input device has transmitted the [INTERIM] response in which the status data is [busy] is about 10 seconds in advance and executes other controls such as transmission of stream data from the source device based on the time T2. Accordingly, by executing the processing examples 5, 6, a proper control based on the status of the target device becomes possible.

Next, a communication method and a communication apparatus according to a second embodiment of the present invention will be described with reference to FIGS. 25 to 44. Throughout FIGS. 25 to 44, elements and parts identical to those of the first embodiment shown in FIGS. 3 to 24 are identified by the same reference numerals.

Figure 25:
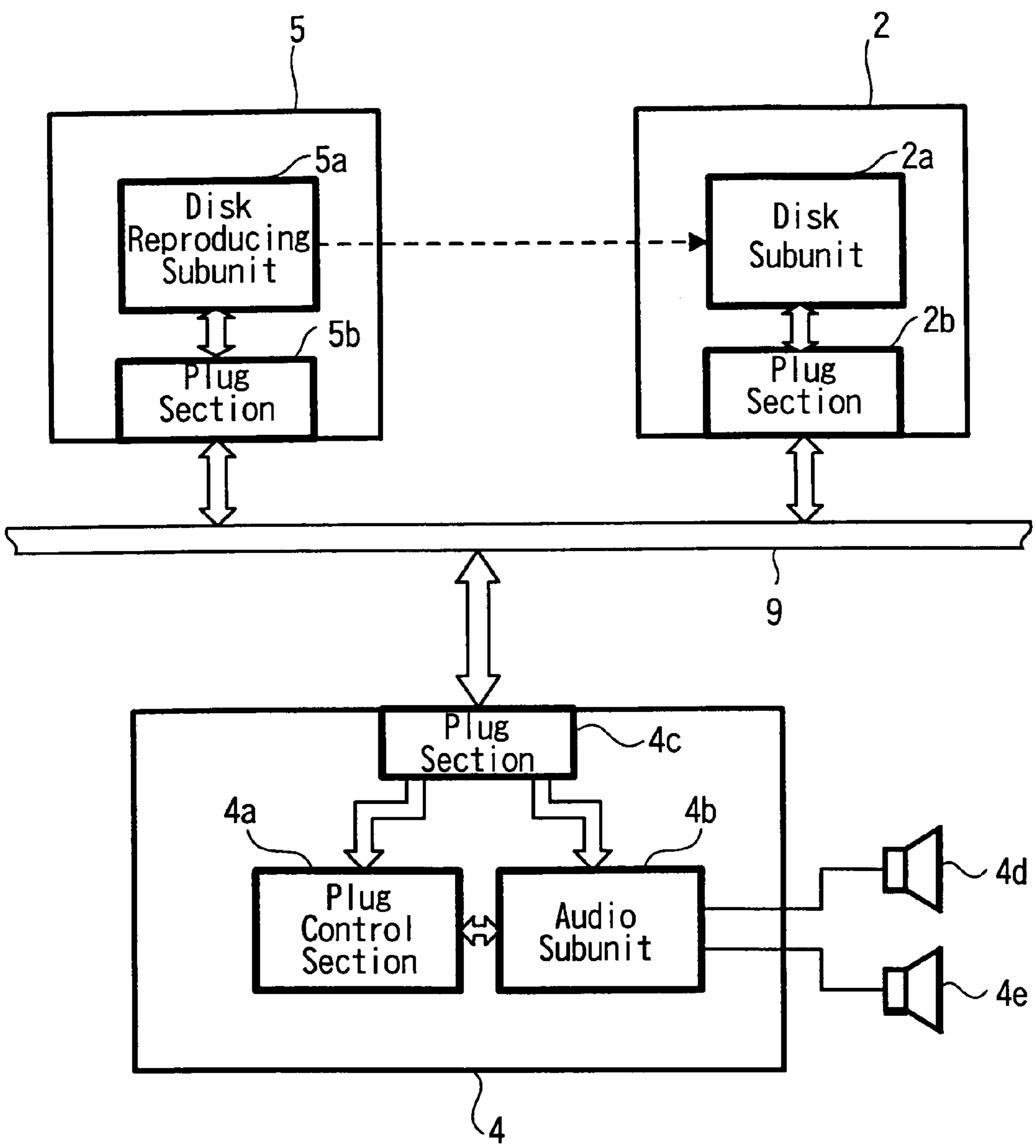
FIG. 25 is a block diagram showing an example of an arrangement of a system according to a second embodiment of the present invention.

An example of an arrangement of a network system according to this embodiment will be described with reference to FIG. 25. In this network system, a plurality of devices are connected through the IEEE 1394 serial data bus 9 similarly to the first embodiment. The IEEE serial data bus 9 will hereinafter be referred to as a "bus 9" for simplicity similarly to the first embodiment. As shown in FIG. 25, the audio deck (audio recording and reproducing apparatus) 2, the amplifying apparatus 4 and the audio reproducing apparatus 5 are connected to the bus 9. Each device is provided with the IEEE 1394 bus connection terminal and implements therein a function so that each device can be controlled by the AV/C command. In the example of transmission which will be described later on, the amplifying apparatus 4 or the audio reproducing apparatus 5 assumes a device (controller) which executes control of transmission on the bus 9. Other devices (not shown) connected to the bus 9 may execute control of transmission on the bus 9.

From a standpoint of functions prescribed by the AV/C command, the respective devices 2, 4, 5 can be regarded as arrangements including subunits for executing processing to realize respective functions and plug sections for inputting and outputting data between the bus 9 and the internal subunits. Specifically, the audio deck 2 includes the disk subunit 2*a* for recording data on the disk and reproducing data from the disk. The amplifying apparatus 4 includes a control section 4*a* for executing the control function and an audio subunit 4*b* for outputting an audio signal. Speaker apparatus 4*d*, 4*e* are connected to the audio subunit 4*b*. The audio reproducing apparatus 5 includes a disk reproducing subunit 5*a* for reproducing data from the disk. The respective devices 2, 4, 5 include plug sections 2*b*, 4*c*, 5*b*. The respective plug sections 2*b*, 4*c*, 5*b* include a plurality of plugs by which the respective plug sections 2*b*, 4*c*, 5*b* can be connected to a plurality of channels on the bus 9. A relationship between the plug and the channel is the same as that of the first embodiment that has already been described so far with reference to FIG. 7.

Figure 26:
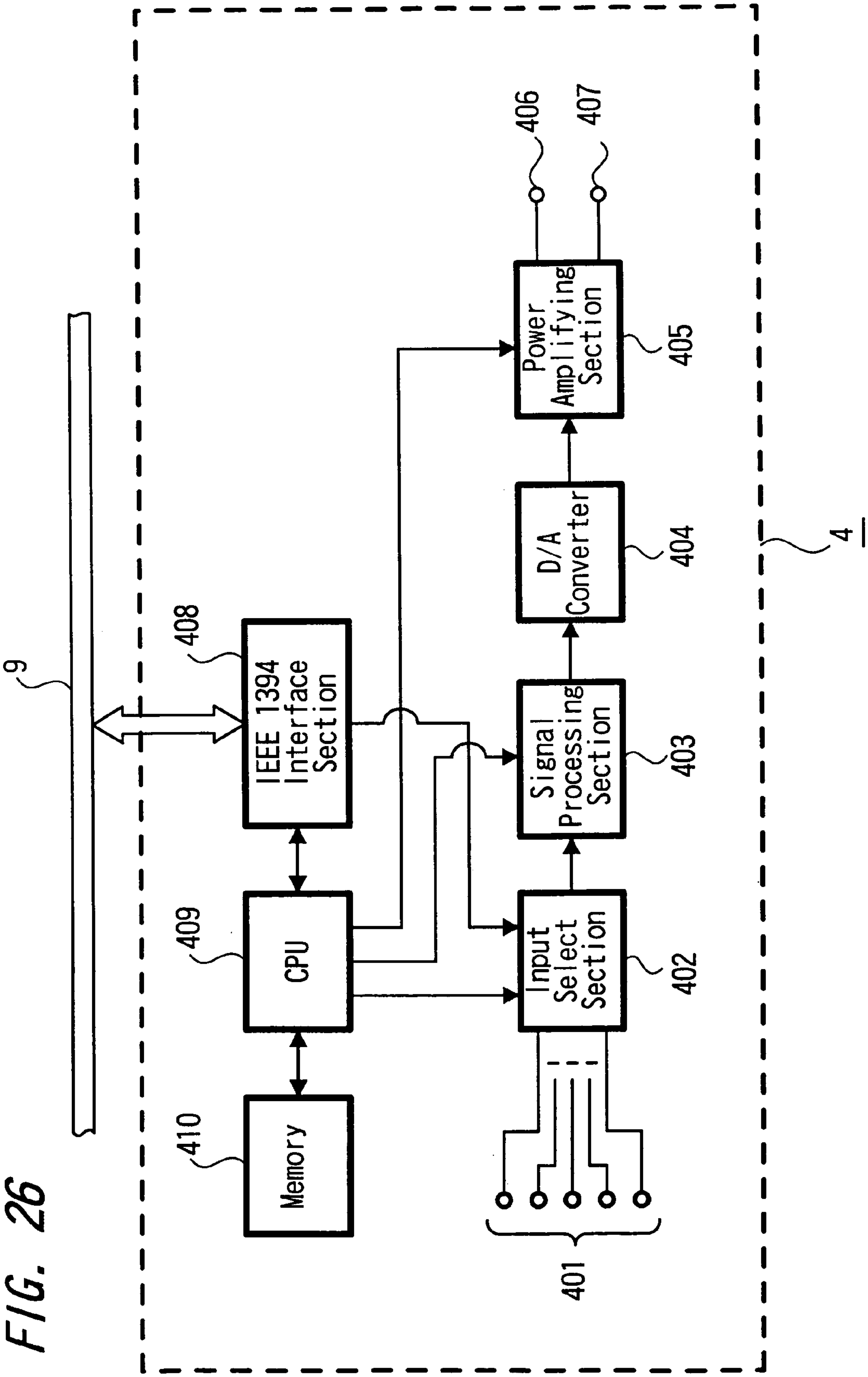
FIG. 26 is a block diagram showing an example of an internal arrangement of an amplifying apparatus according to the second embodiment of the present invention.

FIG. 26 shows one example of an internal arrangement of the amplifying apparatus 4. As shown in FIG. 26, the amplifying apparatus 4 includes an input terminal group 401 to which there are supplied audio signals (digital data or analog signals) from a plurality of audio devices. An input selecting section 402 selects any audio signal from the audio signals supplied to the input terminal group 401. Then, a signal processing section 403 effects necessary signal processing on the selected audio signal. The signal processing section 403 effects signal processing such as correction of signal characteristics and multichannel processing by using a digital signal processing circuit called a DSP (Digital Signal Processor). If a selected input signal is an analog signal, then such inputted analog signal will be converted into a digital signal and then processed within the signal processing section 403.

Digital audio data outputted from the signal processing section 403 is supplied to a digital-to-analog converter (D/A converter) 404, in which it is converted into an analog audio signal. The analog audio signal from the D/A converter 404 is supplied to a power amplifying section 405, in which it is amplified to power to such an extent that speaker apparatus can be driven. The output from the power amplifying section 405 is supplied to a speaker apparatus connected through speaker terminals 406, 407.

The amplifying apparatus 4 according to this embodiment includes an IEEE 1394 interface section 408 so that, when audio data transmitted through the bus 9 is received by the interface section 408, the received audio data can be supplied through the input selecting section 402 to the signal processing section 403.

Signal processing operation within the amplifying apparatus 4 a and receiving operation through the bus 9 are executed under control of a central processing unit (CPU) 409. The CPU 409 has a memory 410 connected thereto and in which there are stored data necessary for controlling.

Figure 27:
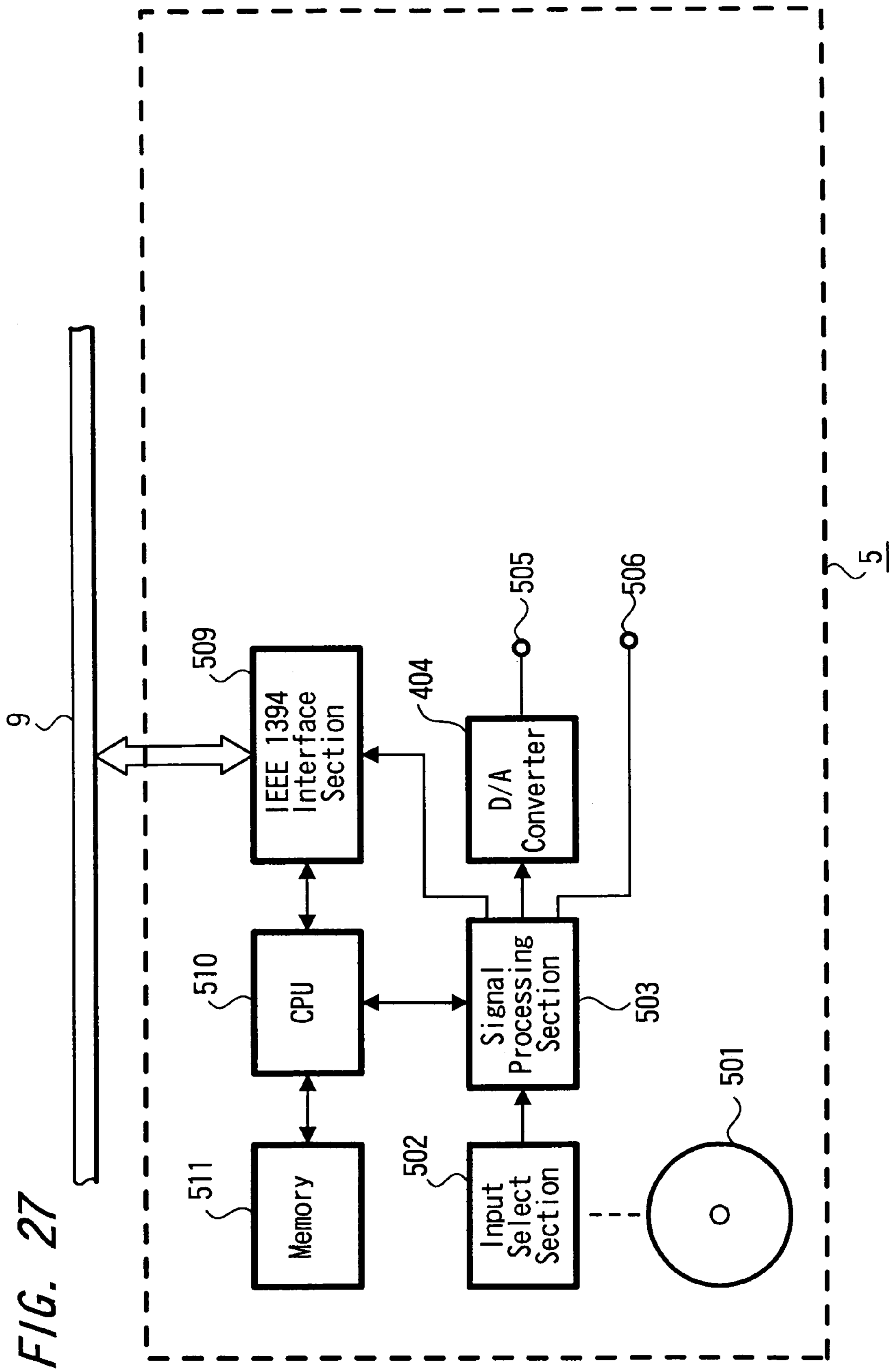
FIG. 27 is a block diagram showing an example of an internal arrangement of an audio reproducing apparatus according to the second embodiment of the present invention.

FIG. 27 shows an example of an internal arrangement of the audio reproducing apparatus 5. The audio reproducing apparatus 5 is an apparatus capable of reproducing an optical disk called a compact disc (CD) in which digital audio data is recorded. Specifically, as shown in FIG. 27, data recorded on an optical disk 501 loaded onto the audio reproducing apparatus 5 is optically read out by an optical pickup 502. The signal thus read out from the optical disk 501 by the optical pickup 502 is supplied to a reproducing system circuit 503, in which it is processed to provide reproduced data. The reproduced data from the reproducing system circuit 503 is supplied to a digital-to-analog converter (D/A converter) 504, in which it is converted into an analog audio signal and outputted from an analog output terminal 505, thereby being supplied to audio devices connected to the analog output terminal 505. Digital audio data, which is not converted by the D/A converter 504, is outputted from a digital output terminal 506. Moreover, the audio data reproduced from the optical disk 501 may be supplied to the IEEE interface section 509 by which it can be transmitted to the bus 9 connected thereto.

Reproducing operation within the audio reproducing apparatus 5 and data transmission through the bus 9 are executed under control of a central processing unit (CPU) 510. A memory 511 for storing therein data necessary for controlling is connected to the CPU 510.

The arrangement that had been described so far in the first embodiment with reference to FIG. 5 can be applied to the arrangement of the audio deck 2.

Fundamental operation for transmitting data through the IEEE 1394 bus 9 with the respective devices connected thereto is the same as fundamental operation that has already been described in the first embodiment. Specifically, the data transmission structure on the bus 9 is the same as the arrangement shown in FIG. 6 and in which the isochronous transfer and the asynchronous transfer can be made. A relationship among the plug, the plug control register and the isochronous channel necessary for transmitting data on the bus is the same as the arrangement shown in FIG. 7 and in which data transmitted from the output plug of the data transmission source device to the bus can be received by the input plug of the data receiving target device by using the secured channel. Processing for establishing the connection by setting the channel and the plug is executed under control of the control device (controller) connected to the bus.

The respective devices connected to the bus 9 can be controlled and the statuses of these devices can be judged by the AV/C command prescribed that had been described so far with reference to FIG. 8 and FIGS. 9A to 9C. By using this AV/C command, the devices connected to the bus can be controlled and data can be transmitted between the devices connected to the bus under the above control. In this embodiment, command data for controlling the input select state is prepared for the input device (target device) to which stream data can be inputted. The packet of this command is outputted from any one of the output device which outputs corresponding stream data or the control device which controls transmission between the output device and the input device.

FIG. 28 shows an example of a data arrangement of [op code] and [operand] of the input select control command according to this embodiment. This data is located at the packet shown in FIG. 8. A command type becomes [CONTROL] because it is data instructing controlling. Data on [INPUT SELECT] which is the corresponding command is located at the area of [op code]. Data on subfunction (subfunction) which shows instructed contents in detail is located at the area of [operand (0)].

4 bits of the first half of [operand (1)] are reserved and a constant value ("1111", i.e., maximum value F of 4 bits in hexadecimal notation) is located at the 4 bits of the second half of [operand (1)]. A node ID of the output device is located at the area of [operand (2) (3)], and an output plug ID of the output device is located at the area of [operand (4)]. An input plug ID of the input device is located at the area of [operand (5)]. Data on signal destination (signal destination) is located at the area of [operand (6) (7)]. The area of [operand (8)] is reserved. At the stage in which the control command is transmitted, the input plug ID is determined by the input device which received this control command, and hence the maximum value data (FF16), for example, is located at the input plug ID.

With respect to the subfunction located at the area of [operand (0)], as shown in FIG. 29, for example, there are prepared a subfunction of connect ("connect") which is the command for establishing a connection with the output device on the bus, a subfunction of path change ("path change") for instructing the change of path (transmission line) under the condition that the device is selected, a subfunction of select (select) for selecting a device but placing the selected device in the standby mode without establishing the connection and a subfunction of disconnect ("disconnect") for disconnecting the connection with the output device on the bus.

FIG. 30 is a diagram showing an example of a data arrangement of a plug ID located at the area of [operand (4)]. Individual IDs are assigned to 31 serial bus plugs of [0] to [30] and 31 external output plugs of [0] to [30], for example. The external output plugs are those which do not use the bus 9. A portion shown as "Reserved" in FIG. 30 is a data value in which the plug ID is reserved.

FIGS. 31 and 32 are diagrams showing examples of arrangements of signal destination data located at the area of [operand (6) (7)]. The signal destination data are classified into three cases. When the signal destination is not designated, the maximum value FF16 is located at the area of [operand (6)] and FE16 is located at the area of [operand (7)]. In remaining two cases, data on subunit type (subunit type) is located at the 5 bits of the first half of the area of [operand (6)] and subunit ID (subunit ID) is located at the 3 bits of the second half of the area of [operand (6)]. A destination plug ID (destination plug ID) is located at the area of [operand (7)]. In the above two cases, as shown in FIG. 31, for example, when a device serial bus plug or device external output plug ID is located at the area of [operand (7)], the maximum value FF16 is located at the area of [operand (6)]. In this case, IDs are individually assigned to 31 serial bus plugs of [0] to [30] and 31 external output plugs of [0] to [30]. In this example, there are prepared data (in the case of 7F16) for designating any of serial bus plugs without specifying the plug number and data (in the case of FF16) for designating any of external output plugs without specifying the plug number. Further, when a subunit is designated in the area of [operand (6)], as shown in FIG. 32, destination ID of subunit is located at the area of [operand (7)].

When the data in the area of [operand (6)] designates the subunit type of destination except the maximum value FF, as shown in FIG. 32, for example, there are set IDs for individually designating 31 destination plugs of [0] to [30]. Also in this example, there is prepared data (in the case of FF) for designating any of destination plugs without specifying the plug number.

The side which received the input select control command having the above arrangement is adapted to transmit input select control response to a command transmitting source as an answer to the control command. FIG. 33 is a diagram showing an example of data arrangement of [op code] and [operand] of the input select control response obtained in this case. This data is located at the packet shown in FIG. 8. As the response types, there are available the case of [ACCEPTED] which accepts the control command, the case of [REJECTED] which rejects the control command and the case of [INTERIM] which is the interim command to the control command. As shown in FIG. 33, data of [INPUT SELECT] is located at the area of [op code], and data of subfunction (subfunction) indicating instructed contents in detail is located at the area of [operand (0)].

4 bits of the first half of [operand (1)] are reserved and result status which is data of processed result is located at the 4 bits of the second half of [operand (1)]. The same data as those of the control command are located at the areas following [operand (2)]. However, with respect to data such as the input plug ID notified to the control command transmitting source from the response transmitting side, corresponding data are located at corresponding areas.

FIG. 34 is a diagram showing examples of result status data located at the 4-bit section of the second half of [operand (1)]. A relationship between values and processed results will be described below. In the case of response of [ACCEPTED] which accepts the control command, value of data is 0 (shown by a hexadecimal notation) and data was processed without error (i.e., data was processed normally).

In the case of response of [REJECTED] which rejects the control command, when value of data is 1, this indicates that a corresponding device is disabled to receive this control command. When value of data is 2, this indicates that present operation is locked and hence processing is impossible. When value of data is 3, this indicates that a corresponding device is not the owner device of the point-to-point connection set currently (because the connection is set by other device) and hence processing concerning setting of the connection is impossible. When value of data is 4, this indicates that the resource is insufficient and hence processing is impossible. When value of data is 5, this indicates that a designated source device cannot be found and hence processing is impossible. When value of data is 6, this indicates that a designated device is not selected and hence processing is impossible. When value of data is 7, this indicates that a designated device is not registered and hence processing is impossible. Further, when value of data is E, this indicates that processing is impossible for any other reason. When the command type is [INTERIM] response which is an interim response, value of data is F.

FIG. 35 is a diagram showing an example of a data arrangement of input plug ID disposed at the area of [operand (5)]. Individual IDs are assigned to 31 serial bus plugs of [0] to [30] and 31 external input plugs of [0] to [30]. The external input plugs are those which receive transmitted stream data from external sources.

Apart from setting processing of transmission line obtained when the input select control command and the response are transmitted, according to this embodiment, there is prepared a signal source status command which inquires the status and the response to the command. FIG. 36 shows an example of data arrangement of [op code] and [operand] of the signal source status command according to this embodiment. This data is located at the packet shown in FIG. 8. The command type becomes [STATUS] because this data is data inquiring signal source status. As shown in FIG. 36, data of [SIGNAL SOURCE]which is corresponding command is located at the area of [op code] and a constant value such as the maximum value FF is located at the area of [operand (1) (2)]. Data of signal destination (signal destination) is located at the area of [operand (3) (4)].

FIG. 37 is a diagram showing an example of data arrangements of [op code] and [operand] of response to this signal source status command. This data is located at the packet shown in FIG. 8. As shown in FIG. 37, with respect to the packet of this response, 3-bit output status (output status) data which is data instructing the output status, 1-bit conv (conv) data showing setting concerning conversion and 4-bit signal status (signal status) data indicating the signal status are located at the area of the [operand (0)] of the received control command. At the area of the [operand (1) (2)], there is located signal source (signal source) data which is data concerning a plug which becomes a source of a signal destination indicated by the signal source status command. In other areas, control command data is returned as it is.

FIG. 38 is a diagram showing example of output status data which instructs the signal output status. In this example, when the output status data is held at a value 0, this indicates an effective packet output. When the output status data is held at a value 1, this data indicates that a signal cannot be transmitted due to the status of the inside of the input device side. When the output status data is held at a value 2, this data indicates that a transmission line cannot be secured due to insufficient band or channel and a signal cannot be outputted. When the output status data is held at a value 3, this data indicates that the device cannot output packets because the point-to-point connection is not established although the device is ready to output packets. When the output status data is held at a value 4, this data indicates that the output is a virtual output status. Values following the value 5 are reserved.

FIG. 39 is a diagram showing an example of conv data for effecting setting concerning conversion. This conv data is 1-bit data. When this conv data is held at a value 0, this data indicates that a signal format of a signal outputted through the destination plug cannot be converted. When this conv data is held at a value 1, this data indicates that the signal format of the signal outputted through the destination plug can be converted.

FIG. 40 is a diagram showing an example of an arrangement of signal status indicating a signal status. The area of the signal status is formed of 4 bits and each bit indicates an independent signal status type. In this example, when the first bit is held at "1", this indicates that some processing other than the signal status types shown by other bits is effected on the signal. When the first bit is held at "0", this indicates that the above processing is not effected on the signal. When the second bit is held at "1", this indicates that the signal type is a subset (partial) signal of the original signal. When the second bit is held at "0", this indicates that the signal type is not the subset signal. When the third bit is held at "1", this indicates that the signal type is converted from the format of the original signal. When the third bit is held at "0", this indicates that the signal type is not converted from the format of the original signal. When the fourth bit is held at "1", this indicates that the signal type is a signal in which display character such as characters called an "on-screen display" (OSD) are superimposed upon the original signal. When the fourth bit is held at "0", this indicates that the signal type is a signal in which display characters are not superimposed upon the original signal. When all bits of the signal status area are held at "0", this indicates that the signal type is the same signal as the original signal.

FIG. 41 is a diagram showing an example of data concerning serial bus plug or external plug data located at the area of [operand (2)] of the signal source status command. IDs are individually assigned to 31 serial bus input plugs [0] to [30] and 31 external input plugs [0] to [30]. The external input plugs are those which do not use the bus 9. At that time, the maximum value FF16 is located at the area of [operand (1)].

Figure 42:
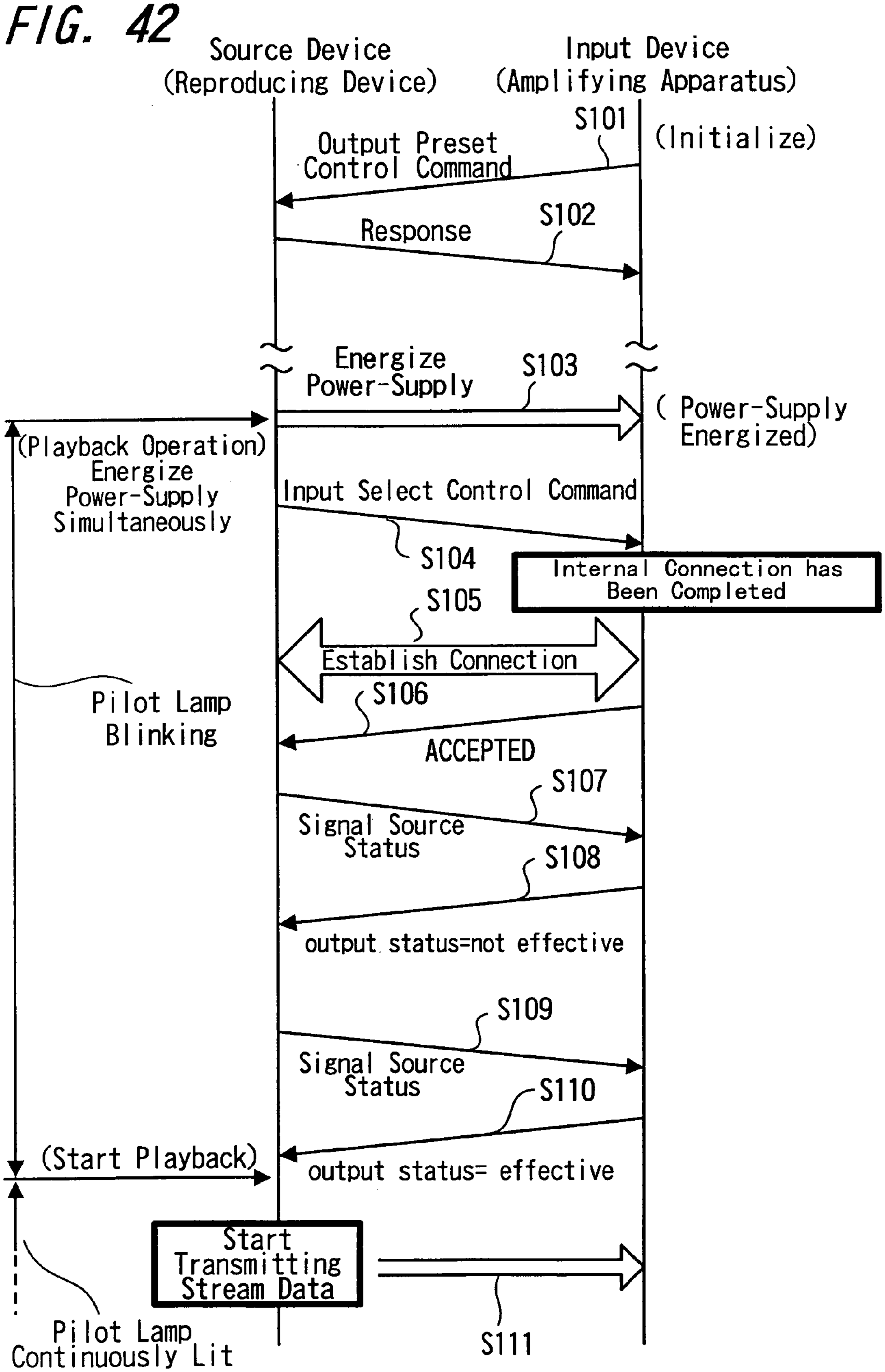
FIG. 42 is an explanatory diagram showing a processing example (processing example 1) according to the second embodiment of the present invention.

Next, transmission processing examples using the input select control command and the signal source status command having the above arrangements will be described with reference to FIGS. 42 to 44.

PROCESSING EXAMPLE 1

In this example, a stream data output device (source device) assumes an audio reproducing apparatus, and an input device (target device) assumes an amplifying apparatus for receiving audio data (stream data) reproduced and transmitted from the reproducing apparatus and which outputs the processed audio data from speakers. The above reproducing apparatus and amplifying apparatus are corresponding to the disk reproducing apparatus 5 shown in FIG. 27 and the amplifying apparatus 4 shown in FIG. 26. In this example, the input device side serves as a controller for executing a connection management, and audio data is transmitted through a transmission line set by such connection management.

In this example, first, the amplifying apparatus 4 transmits output preset control command to register the amplifying apparatus 4 Deserving as the input device connected to the bus 9 as a destination to which the input select control command is transmitted from the disk reproducing apparatus 5 serving as the source device to the disk reproducing apparatus 5 (step S101). When the amplifying apparatus receives response to the transmitted command (step S102), the amplifying apparatus 4 confirms that it was registered on the disk reproducing apparatus 5.

Thereafter, let it be assumed that the disk reproducing apparatus 5 reproduced the disk. At that time, if the disk reproducing apparatus 5 is not energized, then the reproducing apparatus 5 may be energized by this reproducing operation. If the amplifying apparatus 4 which is the target to which the reproduced signal is outputted is not energized, then the disk reproducing apparatus 5 transmits a power-supply energizing command through the bus 9 to the amplifying apparatus 4 (step S103). When receiving this power-supply energizing command, the amplifying apparatus 4 is energized. The power-supply de-energized state represents the state in which the device is placed in the standby mode under the condition that it can be energized by the supply of some controlling signal (i.e., so-called standby mode). In this standby mode, the amplifying apparatus 4 and the disk reproducing apparatus 5 are able to receive data transmitted thereto through the bus 9. The disk reproducing apparatus 5 according to this example includes a pilot lamp concerning the reproducing operation. In the standby mode until the playback is started by the reproducing operation, the pilot lamp can blink. When the playback starts, after the pilot lamp begins to blink, the pilot lamp may be lit continuously.

After the power-supply energizing processing has been ended, the reproducing apparatus transmits the input select control command to the amplifying apparatus 4 (step S104) so that the amplifying apparatus 4 executes setting so that audio data reproduced by the disk reproducing apparatus 5 may be transmitted to the amplifying apparatus 4 through the bus 9. At that time, without the power-supply energizing command, the amplifying apparatus 4 whose power-supply is in the de-energized state may receive this input select control command and thereby energized. This input select control command is the command having the arrangement shown in FIG. 28. After the amplifying apparatus 4 which received this command has completed the internal connection between a subunit (corresponding to the audio subunit shown in FIG. 25) which executes output processing and a predetermined input plug and has executed setting to enter audio data, the point-to-point connection between the disk reproducing apparatus 5 and the amplifying apparatus 4 on the bus 9 is established (step S105). When the point-to-point connection cannot be established and the response cannot be issued within a time period prescribed by the AV/C command due to some cause, [INTERIM] response which is an interim response is transmitted from the amplifying apparatus 4 to the disk reproducing apparatus 5.

When the above connection is established, response indicating that processing for the command is executed normally is transmitted from the amplifying apparatus 4 to the disk reproducing apparatus 5 (step S106). This response is the input select control response having the arrangement shown in FIG. 33. Since the input preparation concerning the connection setting has been completed, the response type becomes [ACCEPTED].

Next, the disk reproducing apparatus 5 transmits the signal source status command to the amplifying apparatus 4 to confirm whether or not the amplifying apparatus 4 is ready to process audio data (step S107). This signal source status command is the command having the arrangement shown in FIG. 36. When the amplifying apparatus 4 received this command, the amplifying apparatus 4 returns response based on the current status of the amplifying apparatus to the disk reproducing apparatus 5. In the example shown in FIG. 42, when the signal source status command is transmitted to the amplifying apparatus 4 at the step S107, the amplifying apparatus 4 is not ready to process audio output and output status is [not effective] (data held at the value 1 shown in FIG. 38) in which inputted data cannot be received as the response (step S108) to the transmitted command.

When the disk reproducing apparatus 5 serving as the source device receives this response, after a certain time period elapsed (e.g., after several seconds), the disk reproducing apparatus 5 again transmits the signal source status command to the amplifying apparatus 4 to confirm whether or not the amplifying apparatus 4 becomes ready to process audio data (step S109). In this case, let it be assumed that data [effective] indicating that the output status is effective for receiving inputted data is obtained as the response to this signal source status command (step S110). At that time, if the response is [not effective], then the signal source status command is repeatedly transmitted from the disk reproducing apparatus 5 to the amplifying apparatus 4 at an arbitrary interval until [effective] response is obtained. If the disk reproducing apparatus 5 has to understand that the point-to-point connection that has been established by the previous input select control command is changed during the response of the signal source status command is [not effective], then the input select status command is transmitted from the disk reproducing apparatus 5 to the amplifying apparatus 4. When receiving this input select status command, the amplifying apparatus 4 transmits response based on the status concerning the point-to-point connection of the amplifying apparatus 4 to the disk reproducing apparatus 5. Thus, the disk reproducing apparatus 5 can confirm the status of the point-to-point connection of the amplifying apparatus 4.

When the disk reproducing apparatus 5 confirms that the response to the signal source status command is the response [effective], the disk reproducing apparatus 5 starts reproducing the disk loaded thereon and starts transmitting resultant reproduced audio data to the amplifying apparatus 4 through the transmission line set at the step S105 (step S111). At the stage in which this disk reproducing apparatus 5 starts reproducing the disk, the pilot lamp that the disk reproducing apparatus 5 includes for displaying playback operation is changed from the blinking state to the continuous lighting state.

With the above processing, while the connection on the bus is being executed under management of the input device, data such as audio data outputted from the source device can be processed by the input device side without being missed. To be concrete, since the source device starts outputting data such as audio data at the stage in which audio data can be outputted from the speakers connected to the amplifying apparatus after the source device (disk reproducing apparatus) had executed the playback operation, it is possible to prevent the starting portion of the audio data from being missed. In particular, in the case of the example shown in FIG. 42, a factor that the response at the step S108 to the signal source status command at the step S107 becomes [not effective] might be a limit which is imposed upon the operation of the audio processing circuit during several second immediately after the reproducing apparatus had been energized. Even when the playback operation is executed at substantially the same time the reproducing apparatus is energized, it is possible to effectively prevent the starting portion of the audio data from being missed. According to the above example, after [not effective] response has been confirmed, it is confirmed by transmitting again the signal source status command whether or not the response becomes [effective]. The present invention is not limited thereto, and the following variant also is possible. That is, after a certain time period (e.g., several seconds) passed since [not effective] response had been confirmed, the source device may start transmitting stream data without confirming the [effective response]. In a like manner, after a certain time period (e.g., several seconds) passed since the response [ACCEPTED] to the input select control command had been received, the source device may start transmitting stream data.

While the point-to-point connection in the plug has been described in the above example, if the amplifying apparatus 4 can recognize its external terminal which physically connects the amplifying apparatus 4 to an external terminal of the disk reproducing apparatus 5 to transmit audio data, the present invention can also be applied to the external terminal. For example, the present invention can be applied to the case in which a device connected to the external terminal of the amplifying apparatus 4 can be registered by user's operation.

According to the case of the processing example 1, since the input device is energized at the stage in which the reproducing apparatus side is energized after the reproducing operation was executed, even when the input device side is placed in the de-energized state (standby mode), audio data can reliably be transmitted and processed without operating a power switch of the input device.

Furthermore, since the source device side includes the pilot lamp concerning the playback operation in which the pilot lamp blinks to indicate that the source device is placed in the playback standby state and the pilot lamp is being continuously light to indicate that the playback is started, it is convenient for a user who executes playback operation on the source device to easily understand the transmission state by only visually confirming the state of the pilot lamp. While the playback standby state and the start of reproduction can be discriminated from each other by the blinking of the pilot lamp and the continuous lighting of the pilot lamp as described above, the present invention is not limited thereto, and similar notification can be executed by other reprocessing such as the change of colors of the pilot lamp.

PROCESSING EXAMPLE 2

In this example, after the input device has executed the connection management between it and the source device under control of the controller (e.g., amplifying apparatus 4 shown in FIG. 25) on the bus, audio data reproduced by the reproducing apparatus (e.g., disk reproducing apparatus 5 shown in FIG. 25) serving as the source device is recorded, i.e., dubbed by the recording apparatus (e.g., audio deck 2 shown in FIG. 25) serving as the input device.

Figure 43:
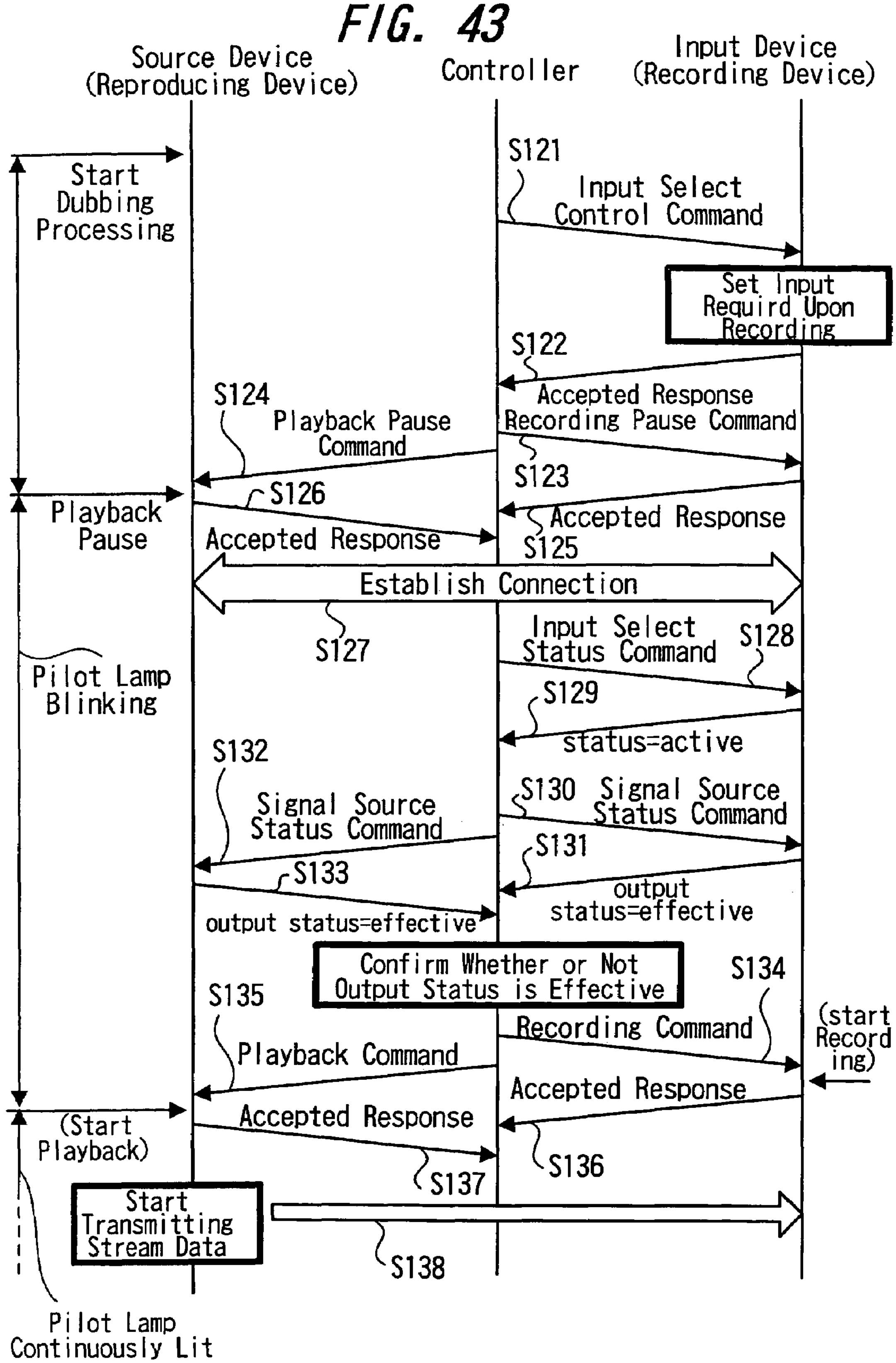
FIG. 43 is an explanatory diagram showing a processing example (processing example 2) according to the second embodiment of the present invention.

Referring to FIG. 43, in order to execute dubbing processing, first, the controller transmits the input select control command to the audio deck 2 serving as the input device (step S121), and sets the source device which inputs data recorded by the audio deck 2 to the disk reproducing apparatus 5. The audio deck 2 transmits to the controller [ACCEPTED] response indicating that processing to the input select control command was executed normally (step S122).

When the controller receives the [ACCEPTED] response, the controller transmits a recording pause standby command to the audio deck 2 (step S123) and also transmits a playback pause command to the disk reproducing apparatus 5 (step S124). When receiving this recording pause command, the audio deck 2 transmits [ACCEPTED] response indicating the acceptance of processing to the controller (step S125), and the point-to-point connection between the disk reproducing apparatus 5 and the audio deck 2 on the bus 9 is established (step S127). When receiving the playback pause command, the disk reproducing apparatus 5 transmits to the controller [ACCEPTED] response indicating that it received processing (step S126).

The controller, which has received these responses, transmits the input select status command to the audio deck 2 (step S128) to confirm the status of the point-to-point connection established between the audio deck 2 and the disk reproducing apparatus 5. When receiving this input select status command, the audio deck 2 transmits to the controller the response based on the status concerning the point-to-point connection of the audio deck 2 (step S129). At that time, assuming that the point-to-point connection between the disk reproducing apparatus 5 and the audio deck 2 is established, then the status becomes [active] which indicates that the point-to-point connection was already established.

Next, the controller transmits the signal source status command to the audio deck 2 in order to confirm whether or not the audio deck 2 is ready to record audio data (step S130). This signal source status command is the command having the arrangement shown in FIG. 36. When receiving this signal source status command, the audio deck 2 returns response based on the status of the audio deck 2 to the controller (step S131). At that time, assuming that the audio deck 2 is ready to record audio data, then the response becomes [effective] (data having the value 0 shown in FIG. 38) indicating that the output status is effective to accept inputted data. Further, in order to confirm whether or not the disk reproducing apparatus 5 is ready to output audio data, the controller transmits the signal source status command to the disk reproducing apparatus 5 (step S132). When receiving the signal source status command, the disk reproducing apparatus 5 returns the response based on the status of the disk reproducing apparatus 5 to the controller (step S133). At that time, assuming that the disk reproducing apparatus 5 is ready to output audio data, then the output status becomes [effective] (data having the value 0 shown in FIG. 38).

Instead of transmitting these signal source status commands, there may be transmitted signal source notify command as [NOTIFY] command which is command for notifying the change of the status to the outside. A device, which received the signal source notify command, transmits [INTERIM] data which is response indicating the acceptance of the signal source notify command. At that time, the output status is set to [not effective]. Thereafter, when the audio deck 2 becomes ready to record audio data and the disk reproducing apparatus 5 becomes ready to output audio data, the respective devices 2 and 5 transmit [changed] data which is response indicating that the status was changed. At that time, the output status is [effective].

When the controller confirms the response in which the output status is [effective] from the response of the signal source status command transmitted to the audio deck 2 and the disk reproducing apparatus 5, the controller transmits a recording start command to the audio deck 2 (step S134). Simultaneously, the controller transmits a playback start command to the disk reproducing apparatus 5 (step S135). The controller can confirm based on the responses (steps S136, S137) to the respective commands that the recording start and the playback start are executed. In this manner, processing for transmitting stream data (audio data) reproduced from the disk by the disk reproducing apparatus 5 to the audio deck 2 is started (step S138).

Also in this case of the processing example 2, if the reproducing apparatus includes the pilot lamp concerning the playback state, then the pilot lamp is blinked at the same time the playback pause command is transmitted to the disk reproducing apparatus 5 at the step S124. Then, when the disk reproducing apparatus 5 starts playback in response to the playback command received at the step S135, the pilot lamp that has been blinking is lit continuously. If the reproducing apparatus is served also as the controller, then when dubbing processing is started, the disk reproducing apparatus 5 is placed in the playback pause mode so that the pilot lamp is blinked.

With the above processing, since it is confirmed that the input device side is ready to input data while the connection on the bus is being executed by the input device under control of the controller, it becomes possible for the input device side to process data such as audio data outputted from the source device without missing data. Further, since it is confirmed that the source device side is ready to output data and then the output is started, a timing at which the input device side inputs data can be controlled to be optimum. In the case of the processing example 3, since it is confirmed that the source device side is ready to output data and then the recording (step S134) and the playback (step S135) are started, the recording can be started under the condition that audio data is outputted reliably. The source device or the input device may be served as the controller as well.

PROCESSING EXAMPLE 3

In this example, after the connection management between the input device and the source device had been executed under controller of the controller (e.g., amplifying apparatus 4 shown in FIG. 25) on the bus, audio data reproduced by the reproducing apparatus (e.g., disk reproducing apparatus 5 shown in FIG. 25) serving as the source device is recorded, i.e., dubbed by the recording apparatus (e.g., audio deck 2 shown in FIG. 25) serving as the input device.

Figure 44:
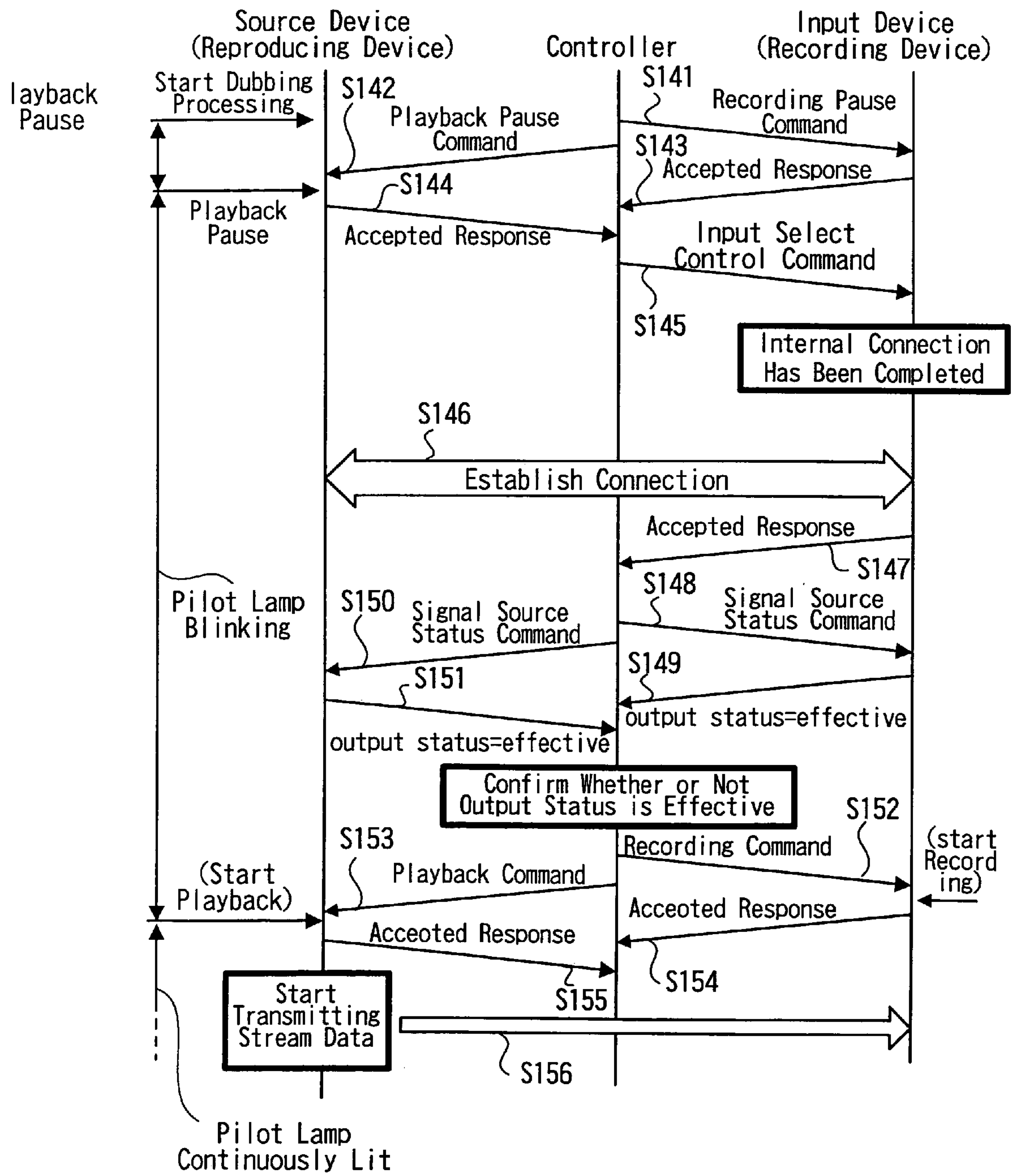
FIG. 44 is an explanatory diagram showing a processing example (processing example 3) according to the second embodiment of the present invention.

Referring to FIG. 44, first, the controller transmits recording pause standby command to the audio deck 2 serving as the input device (step S141) and also transmits a playback pause command to the disk reproducing apparatus 5 (step S142). The controller can confirm by [ACCEPTED] responses (steps S143, S144) to the respective commands that the audio deck 2 is placed in the recording pause mode and the disk reproducing apparatus 5 is placed in the playback pause mode.

When the controller receives these commands, the controller transmits the input select control command to the audio deck 2 (step S145) and starts establishing the internal connection within the audio deck 2 and the point-to-point connection between the disk reproducing apparatus 5 and the audio deck 2 on the bus 9 such that audio data reproduced by the disk reproducing apparatus 5 can be received and recorded by the audio deck 2 (step S146).

After the above connections had been established, the audio deck 2 transmits to the controller [ACCEPTED] response indicating that processing to the command is executed normally (step S147).

Next, in order to confirm whether or not the audio deck 2 is ready to record audio data, the controller transmits the signal source status command to the audio deck 2 (step S148). This signal source status command has the arrangement shown in FIG. 36. When receiving this signal source status command, the audio deck 2 transmits response based on the status in which the audio deck 2 is placed at the present (step S149). At that time, assuming that the deck 2 is ready to record audio data, then the output status becomes [effective] (data having the value 0 shown in FIG. 38) indicating that inputted data is received.

Further, in order confirm whether or not the disk reproducing apparatus 5 is ready to output audio data, the controller transmits the signal source status command to the disk reproducing apparatus 5 (step S150). When receiving this signal source status command, the disk reproducing apparatus 5 returns response based on the status of the disk reproducing apparatus 5 to the controller (step S151). At that time, assuming that the disk reproducing apparatus 5 is ready to output audio data, then the output status becomes [effective] (data having the value 0 shown in FIG. 38).

Instead of transmitting the signal source status command, there may be transmitted signal source notify command as [NOTIFY] command which is command for notifying the change of the status to the outside. The device, which has received the signal source notify command, transmits [INTERIM] data which is response to notify the reception of the transmitted signal source notify command. At that time, the output status is set to [not effective]. Thereafter, when the audio deck 2 becomes ready to record audio data and when the 2 disk reproducing apparatus 5 becomes ready to output audio data, the respective devices transmit [changed] data indicative of the change of the status. At that time, its output status is [effective].

When the controller confirms by the responses to the signal source status commands transmitted to the audio deck 2 and the disk reproducing apparatus 5 the response in which the output status is [effective], the controller transmits a recording start command to the audio deck 2 (step S152), and the controller transmits a playback start command to the disk reproducing apparatus 5 (step S153). The controller can confirm by the responses (steps S154, S155) to the respective command that the audio deck 2 starts the recording and the disk reproducing apparatus 5 starts the playback. In this manner, processing for transmitting stream data (audio data) reproduced from the disk by the disk reproducing apparatus 5 to the audio deck 2 is started (step S156).

Also in the case of the processing example 3, if the reproducing apparatus includes the pilot lamp concerning the playback state, then the pilot lamp is blinked at the same time the playback pause command is transmitted from the controller to the disk reproducing apparatus 5. When the disk reproducing apparatus 5 receives the playback command at the step S153 and starts playback, the pilot lamp that had been blinking is started being continuously lit. If the reproducing apparatus is served also as the controller, then when the dubbing is started, the reproducing apparatus is placed in the playback pause mode and the pilot lamp is blinked.

With the above processing, by confirming that the input device side is ready to input data while the input device is executing the connection on the bus under control of the controller, it becomes possible for the input device side to process data such as audio data outputted from the source device side without missing the data. Further, an optimum input timing can be controlled by outputting data after it has been confirmed that the source device side is ready to output data. In the case of the processing example 3, after it has been confirmed that the source device side is ready to output data, the recording (step S152) and the playback (step S153) are started so that the recording can be started under the condition that audio data is outputted reliably. The source device of the input device may be served as the controller as well.

While audio data and video data have been described so far as transmitted stream data in the above first and second embodiments, the present invention is not limited thereto, and can be applied to the case in which other stream data is transmitted. Moreover, devices that can be applied to the source device, the input device and the controller also are not limited to those described in the above first and second embodiments.

While the network comprised of the IEEE 1394 bus has been described so far in the above first and second embodiments, the present invention is not limited thereto, and can be applied to the case in which data is similarly transmitted between devices in other network arrangement.

While the functions for executing the above processing are set to the respective devices in the above first and second embodiments, the present invention is not limited thereto, and the following variant is also possible. That is, some a program for executing similar processing may be distributed to a user by using a distribution medium and the user may implement the program stored in the above medium in a suitable means such as a computer connected to a bus (IEEE 1394 bus, etc.) thereby to execute similar functions. A distribution medium in this case is not limited to a physical recording medium such as an optical disk and a magnetic disk and may be a medium which is supplied to a user by a communication means such as the internet.

According to the present invention, when the input device side cannot execute the input setting of stream data due to some cause, the device side which controls transmission on the network can understand that the input device side is unable to execute the input setting and can cope with such trouble. Therefore, the output device side of the stream data can temporarily delay the output of the stream data so that the input device side can receive perfect stream data whose starting portion is not dropped.

In this case, since the data indicating that the input setting cannot be executed temporarily is data indicating that the input device side is placed in the standby mode although the connection within the input device has been completed such that the input device can input stream data, when the input device is set to other mode that the standby mode, the output device becomes able to transmit stream data.

Since the data indicating that the input setting cannot be executed temporarily is data indicating that the input device cannot input stream data due to other cause although the connection within the input device has already been completed such that the input device can input stream data and the connection between the output device and the input device has already been completed, when a countermeasure for removing the cause that the input device is unable to input stream data becomes clear, the output device becomes able to transmit stream data. For example, it is confirmed by polling at any time whether or not the input device becomes possible to input stream data. If it is determined that the input device becomes able to input stream data, then the output device starts transmitting stream data so that stream data can be transmitted reliably. Alternatively, if the output device starts transmitting stream data when command notifying that the input device becomes able to input stream data is transmitted and command notifying that the status of the input device is changed is received by the output device, then the output device becomes able to transmit stream data reliably.

Since the data indicating that the input setting cannot be executed temporarily is data indicating that the connection between the output device and the input device on the network is failed although the connection within the input device has already been completed such that the input device can input stream data, a countermeasure for trying to establish the connection on the network one more time becomes possible.

Since the data indicating that the input setting cannot be executed temporarily is data indicating that a time required when the input device becomes able to process stream data in its inside is longer than an ordinary constant time, when the output device receives this data, the output device becomes able to transmit stream data at a satisfactory timing by delaying a timing at which the output device transmits stream data by a corresponding time. For example, when it takes a certain time period to energize the input device which is placed in the de-energized state, if the above processing is executed, then stream data can be transmitted after the input device becomes able to input stream data correctly since the input device has been energized. Therefore, the transmission processing can be executed satisfactorily without the starting portion of data being dropped.

According to the present invention, the first command for executing the setting such that the data input section of the input device becomes able to input data and the second command for executing the predetermined setting concerning the state that the data input section of the input device become ready to input data are transmitted from the control device side to the input device. Then, if it is determined by the response based on the second command that the data input section of the input device becomes able to input data, then the transmission of stream data is started, Therefore, the device side which controls the transmission on the network can understand that the input device side is ready to input stream data, and the transmission of stream data can be controlled properly.

In this case, since the second command is transmitted from the control device side to the input device one more time if it is determined by the response based on the second command that the input device is not yet ready to input data, the device side which controls the transmission on the network can judge that the status is changed to the state in which stream data can be transmitted.

Further, since the command for energizing the input device is transmitted before the first command is transmitted, the device which controls the transmission can properly manage the control of the power-supply of the input device.

Furthermore, since the display processing for notifying that the transmission of stream data is paused is executed until it is determined by the response based on the second command that the input device is ready to input stream data, those who had operated the communication apparatus to transmit stream data become able to learn the transmission state by visually confirming the display.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A communication method in which a sink apparatus connected to a predetermined network receives stream data via said network sent from a source apparatus connected to said network, comprising the steps of:

sending a command to said sink apparatus from said source apparatus connected to said network to request that said sink apparatus enable a stream data receiving section of said sink apparatus to receive said stream data sent from said source apparatus;

preparing a response to said command by said sink apparatus indicating that a configuration of said stream data receiving section is temporarily disabled when said sink apparatus receives said command; and executing corresponding processing when said apparatus that transmitted said command receives said response, wherein said response includes data indicating when said sink apparatus will be enabled to receive said stream data.

2. The communication method according to claim 1, wherein:

said response includes data indicating that said sink apparatus is placed in a standby state although a connection within said sink apparatus has been completed to allow said sink apparatus to input said stream data; and said source apparatus transmits said stream data as said corresponding processing when said apparatus that transmitted said command receives said response and a connection between said source apparatus and said sink apparatus on said network is completed.

3. The communication method according to claim 1, wherein:

said response includes data indicating that said sink apparatus cannot input said stream data although said connection within said sink apparatus has been completed to allow said sink apparatus to input said stream data and said connection between said source apparatus and said sink apparatus on said network has been completed; and said apparatus that transmitted said command receives said response, said apparatus that transmitted said command performs polling to determine whether said sink apparatus is ready to input said stream data and said source apparatus transmits said stream data as said corresponding processing when it is determined that said sink apparatus is ready to input said stream data.

4. The communication method according to claim 3, wherein when said apparatus that transmitted said command receives said response, said apparatus that transmitted said command transmits a command notifying that said sink apparatus is ready to input said stream data as said corresponding processing and when said apparatus that transmitted said command receives a command indicating that a status of said sink apparatus is changed said source apparatus starts transmitting said stream data.

5. The communication method according to claim 1, wherein said response includes data indicating that a connection between said source apparatus and said sink apparatus on said network has failed although a connection within said sink apparatus has been completed to allow said sink apparatus to input said stream data.

6. The communication method according to claim 1, wherein when said apparatus that transmitted said command receives said response, said apparatus that transmitted said command performs polling to determine whether a connection between said source apparatus and said sink apparatus has been completed and said source apparatus transmits said stream data as said corresponding processing when it is determined by said apparatus that transmitted said command that said connection between said source apparatus and said sink apparatus has been completed.

7. The communication method according to claim 5, wherein:

when said apparatus that transmitted said command receives said response said apparatus that transmitted said command transmits a command notifying that a connection between said source apparatus and said sink apparatus has been completed; and when said apparatus that transmitted said command receives a command indicating that a status is changed said source apparatus starts transmitting said stream data as said corresponding processing.

8. The communication method according to claim 1, wherein said response includes data indicating that a time period required when said sink apparatus becomes ready to process said stream data is longer than an ordinary time period by a constant time.

9. A communication method in which a sink apparatus connected to a predetermined network receives stream data via said network outputted from a source apparatus connected to said network, comprising the steps of:

sending a first command to said sink apparatus from said source apparatus connected to said network to request that said sink apparatus enable a stream data receiving section of said sink apparatus to receive said stream data sent from said source apparatus;

confirming by analyzing a response to said first command that an internal connection in said sink apparatus for receiving said stream data has been completed and that a connection between said source apparatus and said sink apparatus on said network has been completed;

transmitting a second command to said sink apparatus from said source apparatus connected to said network to confirm that said sink apparatus is ready to receive said stream data sent from said source apparatus; and enabling said source apparatus to start transmitting said stream data when it is confirmed that said sink apparatus is able to receive said stream data sent from said source apparatus by analyzing a response to said second command, wherein when said response indicates that said sink apparatus is temporarily disabled, said response includes data indicating when said sink apparatus will be enabled to receive said stream data.

10. The communication method according to claim 9, further comprising the steps of:

transmitting said first command;

issuing an interim response when said sink apparatus cannot issue a response based on said first command within a predetermined time; and confirming by said response based on said first command whether a connection has been completed to allow said sink apparatus to input said stream data.

11. The communication method according to claim 9, further comprising the step of re-transmitting said second command when it is determined by said response based on said second command that said sink apparatus is not able to input said stream data.

12. The communication method according to claim 9, wherein after it has been confirmed by said response based on said second command that said sink apparatus is not able to input said stream data and that said sink apparatus is ready to input said stream data it is confirmed whether said source apparatus and said sink apparatus are connected through said network.

13. The communication method according to claim 9, further comprising the step of transmitting a notifying command for notifying that a status in which said sink apparatus is ready to input said stream data is changed and when it is confirmed by a response based on said command that said sink apparatus is ready to input said stream data said source apparatus starts transmitting said stream data.

14. The communication method according to claim 9, further comprising the step of transmitting a notifying command for notifying that a status in which said sink apparatus is ready to input said stream data is changed and when it is confirmed that said sink apparatus is not able to input said stream data and that said sink apparatus is ready to input said stream data it is confirmed whether said source apparatus and said sink apparatus are connected through said network.

15. The communication method according to claim 9, further comprising the step of transmitting to said source apparatus a confirmation command to confirm whether said source apparatus is ready to transmit said stream data and when it is confirmed by a response based on said confirmation command that said source apparatus is ready to transmit said stream data said source apparatus starts transmitting said stream data.

16. The communication method according to claim 9, further comprising the step of transmitting to said source apparatus a confirmation command to confirm whether said source apparatus is ready to transmit said stream data and when it is determined by a response based on said confirmation command that said source apparatus is not ready to transmit stream data said confirmation command is re-transmitted to said source apparatus.

17. The communication method according to claim 9, further comprising the step of transmitting a notifying command notifying that a status in which said source apparatus is ready to transmit said stream data is changed and when it is determined by a response based on said notifying command that said source apparatus is ready to transmit said stream data said source apparatus starts transmitting said stream data.

18. The communication method according to claim 9, wherein said source apparatus connected to said network transmits a command to energize said sink apparatus before said first command is transmitted.

19. The communication method according to claim 9, wherein when said sink apparatus receives said first command said sink apparatus is energized.

20. The communication method according to claim 9, wherein said source apparatus connected to said network is continuously executing display processing notifying that transmission of said stream data is placed in a standby mode until confirmation by said response based on said second command that said sink apparatus is ready to input said stream data.

21. The communication method according to claim 9, wherein said source apparatus connected to said network is continuously executing display processing notifying that transmission of said stream data is placed in a standby mode until confirmation by a response based on a command notifying that a status in which said sink apparatus is ready to input said stream data is changed that said sink apparatus is ready to input said stream data.

22. The communication method according to claim 1, wherein said predetermined network is an IEEE 1394 bus.

23. The communication method according to claim 9, wherein said predetermined network is an IEEE 1394 bus.

* * * * *